US006914105B1

(12) United States Patent
Charpentier et al.

(10) Patent No.: US 6,914,105 B1
(45) Date of Patent: Jul. 5, 2005

(54) CONTINUOUS PROCESS FOR MAKING POLYMERS IN CARBON DIOXIDE

(75) Inventors: Paul A. Charpentier, London (CA); Joseph M. DeSimone, Chapel Hill, NC (US); George W. Roberts, Raleigh, NC (US)

(73) Assignees: North Carolina State University, Raleigh, NC (US); The University of North Carolina at Chapel Hill, Chapel Hill, NC (US)

(*) Notice: Subject to any disclaimer, the term of this patent is extended or adjusted under 35 U.S.C. 154(b) by 825 days.

(21) Appl. No.: 09/709,206

(22) Filed: Nov. 9, 2000

Related U.S. Application Data

(60) Provisional application No. 60/165,177, filed on Nov. 12, 1999.

(51) Int. Cl.[7] .................................................. C08F 2/12
(52) U.S. Cl. ............................ 526/67; 526/64; 526/88; 526/255; 526/317.1; 526/942; 528/502 R; 528/502 A
(58) Field of Search ............................. 526/67, 64, 88, 526/255, 317.1, 942; 528/502 R, 502 A, 402

(56) References Cited

U.S. PATENT DOCUMENTS

| | | | |
|---|---|---|---|
| 3,522,228 A | * 7/1970 | Fukui et al. ................ 526/942 |
| 5,516,739 A | 5/1996 | Barborak et al. ........... 502/161 |
| 5,561,216 A | 10/1996 | Barborak et al. ........... 528/392 |
| 5,569,730 A | 10/1996 | Goodall et al. ............. 526/282 |
| 5,571,881 A | 11/1996 | Goodall et al. ............. 526/171 |
| 5,705,503 A | 1/1998 | Goodall et al. ............. 526/281 |
| 5,725,756 A | 3/1998 | Subramaniam et al. ... 208/48 R |
| 5,741,869 A | 4/1998 | Goodall et al. ............. 526/171 |
| 5,833,891 A | 11/1998 | Subramaniam et al. ........ 264/7 |
| 5,866,663 A | 2/1999 | Brookhart et al. ........... 526/170 |
| 5,874,029 A | 2/1999 | Subramaniam et al. ....... 264/12 |
| 5,880,241 A | 3/1999 | Brookhart et al. ........... 526/348 |
| 5,880,323 A | 3/1999 | Brookhart, III et al. ..... 585/527 |
| 5,886,224 A | 3/1999 | Brookhart et al. ........... 564/272 |
| 5,891,963 A | 4/1999 | Brookhart et al. ......... 525/326.1 |
| 5,892,101 A | 4/1999 | Brookhart et al. ........... 560/205 |
| 5,907,075 A | 5/1999 | Subramaniam et al. ..... 585/721 |
| 5,912,313 A | 6/1999 | McIntosh, III et al. ..... 526/279 |
| 5,916,989 A | 6/1999 | Brookhart, III et al. . 526/348.6 |
| 5,929,181 A | 7/1999 | Makovetsky et al. ....... 526/171 |
| 6,034,259 A | 3/2000 | Brookhart et al. ........... 556/137 |
| 6,060,569 A | 5/2000 | Bennett et al. ............. 526/172 |
| 6,103,844 A | * 8/2000 | Brothers .................... 526/218.1 |
| 6,103,946 A | 8/2000 | Brookhart, III et al. ..... 585/523 |
| 6,107,420 A | 8/2000 | Grubbs et al. ................ 526/73 |
| 6,111,121 A | 8/2000 | Grubbs et al. ................ 556/21 |
| 6,114,483 A | 9/2000 | Coughlin et al. ........... 526/172 |
| 6,140,439 A | 10/2000 | Brookhart et al. ........... 526/308 |
| 6,403,729 B1 | * 6/2002 | Hergeth et al. ............... 526/68 |

FOREIGN PATENT DOCUMENTS

| | | | |
|---|---|---|---|
| CA | 1274942 | 10/1990 | ......... C08F/120/06 |
| EP | 0590842 A2 | 4/1994 | ............. C08F/2/06 |
| EP | 0684264 A2 | 11/1995 | ......... C08F/212/10 |
| WO | WO 96/06118 | 2/1996 | .......... C08F/16/12 |
| WO | WO 96/28477 | 9/1996 | ............. C08F/2/00 |
| WO | WO 98/28351 | 7/1998 | ........... C08F/14/18 |
| WO | WO 00/53639 | 3/2000 | ............. C08F/2/04 |
| WO | WO 00/29096 | 5/2000 | ........... B01D/61/00 |

OTHER PUBLICATIONS

McClellan et al.; "Polymer Solution–Supercritical Fluid Phase Behavior," *Supercritical Fluid Technology*, Elsevier Science Publishers B.V., XP002161135, pp. 161–178, Amsterdam (1985).

International Search Report, PCT/US00/30765, Date of Mailing: Mar. 14, 2001.

Baker et al.; "Toward Greener Chemistry," *Science* 284:1477–1479 (May 28, 1999).

Canelas et al.; "Polymerizations in Liquid and Supercritical Carbon Dioxide," *ces in Polymer Science* 133:103–140 (1997).

Charpentier et al.; "Continuous Polymerizations in Supercritical Carbon Dioxide: Chain–Growth Precipitation Polymerizations," *Manomolecules* 32:18 5973–5975 (Sep. 7, 1999).

DeSimone et al.; "Synthesis of Fluoropolymers in Supercritical Carbon Dioxide," *Science* 257:945–947 (Aug. 14, 1992).

(Continued)

*Primary Examiner*—Fred Teskin
(74) *Attorney, Agent, or Firm*—Myers Bigel Sibley & Sajovec, PA

(57) ABSTRACT

A method for carrying out the continuous polymerization of a monomer in a carbon dioxide reaction medium comprises the steps of: (a) providing an apparatus including a continuous reaction vessel and a separator; (b) carrying out a polymerization reaction in the reaction vessel by combining a monomer and a carbon dioxide reaction medium therein (and preferably by also combining an initiator therein), wherein the reaction medium is a liquid or supercritical fluid, and wherein the reaction produces a solid polymer product in the reaction vessel; then (c) withdrawing a continuous effluent stream from the reaction vessel during the polymerization reaction, wherein the effluent stream is maintained as a liquid or supercritical fluid; then (d) passing the continuous effluent stream through the separator and separating the solid polymer therefrom while maintaining at least a portion of the effluent stream as a liquid or supercritical fluid; and then (e) returning at least a portion of the continuous effluent stream to the reaction vessel while maintaining the effluent stream as a liquid or supercritical fluid. The need for significant recompression of the continuous effluent stream prior to return to the reaction vessel is thereby minimized. Apparatus for carrying out such methods is also disclosed.

51 Claims, 12 Drawing Sheets

OTHER PUBLICATIONS

Kendall et al.; "Polymerizations in Supercritical Carbon Dioxide," *Chemical Reviews* 99:2 543–563 (1999).

McCoy; "DuPont, UNC R&D Effort Yields Results," *Chemical and Engineering News* p. 10 (1999).

McHugh et al.; *Supercritical Fluid Extraction: Principals and Practice*, $2^{nd}$ Edition, pp. 1–16(1994).

Shaffer et al.; "Chain Polymerizations in Inert Near- and Supercritical Fluids," *TRIP* 3:5 146–153 (May 1995).

* cited by examiner

CONTINUOUS PROCESS FOR MAKING POLYMERS IN CARBON DIOXIDE

CROSS-REFERENCE TO RELATED APPLICATIONS

The present invention claims priority to Provisional Application Ser. No. 60/165,177 filed Nov. 12, 1999, the disclosure of which is incorporated herein by reference in its entirety.

FIELD OF THE INVENTION

The present invention concerns methods and apparatus for the continuous production of polymers in a carbon dioxide reaction medium.

BACKGROUND OF THE INVENTION

Increased environmental concerns and regulations over the use of volatile organic compounds (VOCs) since the late 1980s (e.g. Montreal Protocol in 1987 and the Clean Air Act amendments in 1990) have caused considerable effort being put into finding environmentally benign solvents for industrial use (McHugh, M. A. and V. J. Krukonis, *Supercritical Fluid Extraction: Principles and Practice*. Second ed, ed. H. Brenner. 1994, Boston: Butterworth-Heinemann). DeSimone et al. at the University of North Carolina-Chapel Hill have shown that supercritical carbon dioxide ($scCO_2$) is a viable and promising alternative solvent ($T_c$=31.8° C., $P_c$=76 bar) to perform free-radical, cationic and step-growth polymerizations using batch reactors (DeSimone, J. M., Z. Guan, and C. S. Elsbernd, *Synthesis of Fluoropolymers in Supercritical Carbon Dioxide*. Science, 1992. 257: p. 945–947). This work has been summarized in several recent reviews (Kendall, J. L., et al., *Polymerizations in Supercritical Carbon Dioxide*. Chem.Rev., 1999. 99(2): p. 543–563; Canelas, D. A. and J. M. DeSimone,*Advs. Polym. Sci.,* 1997. 133: p. 103–140; Shaffer, K. A. and J. M. DeSimone, *Chain Polymerizations in Inert Near and Supercritical Fluids*. Trends in Polymer Science, 1995. 3(5): p. 146–153). Indeed, $CO_2$ technology is intended to be commercially implemented by 2006 for the manufacture of Teflon™ by DuPont (McCoy, M., DuPont, *UNC R&D effort yields results*, in *Chemical & Engineering News*, 1999. p. 10). The reasons for the intense industrial interest are that $CO_2$ is cheap ($100–200/ton), of low toxicity, non-flammable, and environmentally and chemically benign. In comparison to existing technologies for making polymers, $CO_2$ technology has several significant advantages as it will allow for the elimination of: a) expensive polymer drying steps; (b) expensive wastewater treatment and disposal steps where significant amounts of monomer, surfactants and emulsifiers are generated (Baker, R. T. and W. Tumas, *Toward Greener Chemistry*. Science, 1999. 284: p. 1477–1478); (c) disposal of "spent" organic solvents; (d) handling, storage and shipping of toxic organic solvent; and (e) chain transfer to solvent, i.e., a reaction that may limit the achievable molecular weight of the polymer.

As industrial interest in using $scCO_2$ as a polymerization medium has grown, several disadvantages of batch reactors have been recognized, including: (1) large reactors which are costly at the high pressures of $scCO_2$; and (2) difficulty in recycling the $CO_2$ and the unreacted monomer. Accordingly, there is a need for new ways to carry out the continuous polymerization of monomers in carbon dioxide, particularly liquid and supercritical carbon dioxide.

SUMMARY OF THE INVENTION

The present invention provides a continuous process for the precipitation polymerization of various monomers in $scCO_2$. In the process, recycling of the $CO_2$ without significant recompression is achieved. A continuous process requires smaller and hence cheaper equipment for large volume, commodity-based polymers. Moreover, continuous removal of polymer from the system, and recycling of monomer and supercritical fluid can be facilitated in a continuous system. As most organic monomers are soluble in liquid and $scCO_2$ (Journal of Organic Chemistry, 1984, vol. 49 pgs. 5097–5101) whereas most polymers are insoluble in $CO_2$, this process can be utilized for polymerization of a great variety of monomers without the necessity of utilizing any expensive surfactant. A continuous system in $scCO_2$ can also be exploited to incorporate in situ steps to purify the resultant polymer by supercritical fluid extraction (SFE) (McHugh, M. A., Krukonis V. J. Supercritical Fluids Extraction: Principles and Practice. Butterworth-Heineman, Stoneham, 1993).

A first aspect of the present invention is, accordingly, a method for carrying out the continuous polymerization of a monomer in a carbon dioxide reaction medium. The method comprises the steps of:

(a) providing an apparatus including a continuous reaction vessel and a separator;

(b) carrying out a polymerization reaction in the reaction vessel by combining a monomer, an initiator, and a carbon dioxide reaction medium therein, wherein the reaction medium comprises liquid or supercritical carbon dioxide and wherein the reaction produces a solid polymer product in the reaction vessel; then (c) withdrawing a continuous effluent stream from the reaction vessel during the polymerization reaction, wherein the effluent stream is maintained as a liquid or supercritical fluid; then (d) passing the continuous effluent stream through the separator and separating the solid polymer therefrom while maintaining at least a portion of the effluent stream as a liquid or supercritical fluid; and then (e) returning at least a portion of the continuous effluent stream to the reaction vessel while maintaining the at least a portion of the effluent stream as a liquid or supercritical fluid (and preferably at a pressure not more than about 50 or 100 psi less than the pressure in the reaction vessel), whereby the need for significant recompression of the continuous effluent stream prior to return to the reaction vessel is minimized.

In a preferred embodiment, the combining of the monomer, the initiator, and the carbon dioxide reaction medium as recited by step (b) is preferably carried out by continuously feeding the monomer, the initiator, and the carbon dioxide reaction medium to the reaction vessel. In another preferred embodiment, a purge is positioned downstream of the reaction vessel (described in detail herein) so as to remove an amount of the effluent stream as deemed appropriate by one skilled in the art. In these preferred embodiments, the at least a portion of effluent that is returned to the reaction vessel is typically a fraction less than one.

A second aspect of the present invention is an apparatus for the continuous polymerization of a monomer in carbon dioxide. The apparatus comprises a continuous reaction vessel; at least one inlet line connected to the reaction vessel; an effluent line connected to the reaction vessel; a separator connected to the effluent line; a return line connecting the separator to the reaction vessel so that liquid or supercritical reaction medium is returned to the reaction vessel from the separators; and a control system or the like serving as a control means for maintaining the reaction medium as a liquid or supercritical fluid in the separator and the return line (and preferably at a pressure not more than 50 or 100 psi different from the pressure in the reaction vessel during polymerization of monomer therein). In one embodiment, solid polymer is retained in the separator.

The present invention may also be carried out with any suitable polymerization reactions, including but not limited to precipitation, microemulsion, emulsion, suspension, and dispersion polymerization reactions. Any suitable initiator may be used, preferably one that is soluble in the liquid or supercritical reaction medium. Also, the initiator that is not consumed in the reaction vessel is preferably returned to the reaction vessel in the reaction medium after the step of passing the effluent stream through the separator. The recycling of the initiator is particularly desirable, since initiators are frequently toxic. Suitable separators include filters, cyclone separators, and separators containing rotating devices therein, as described in greater detail herein. If desired a cooler may be positioned on the effluent line between the reaction vessel and the control valve. A recirculation pump may be positioned on the return line between the separator (or, if a plurality of separators are employed, the separator positioned furthest downstream from the reactor) and the reaction vessel, or at any other suitable location. A condenser may be positioned on the return line between the first and second separators and the reaction vessel.

The present invention is explained in greater detail in the drawings herein and the specification set forth below.

DETAILED DESCRIPTION OF THE PREFERRED EMBODIMENTS

Figure 1:
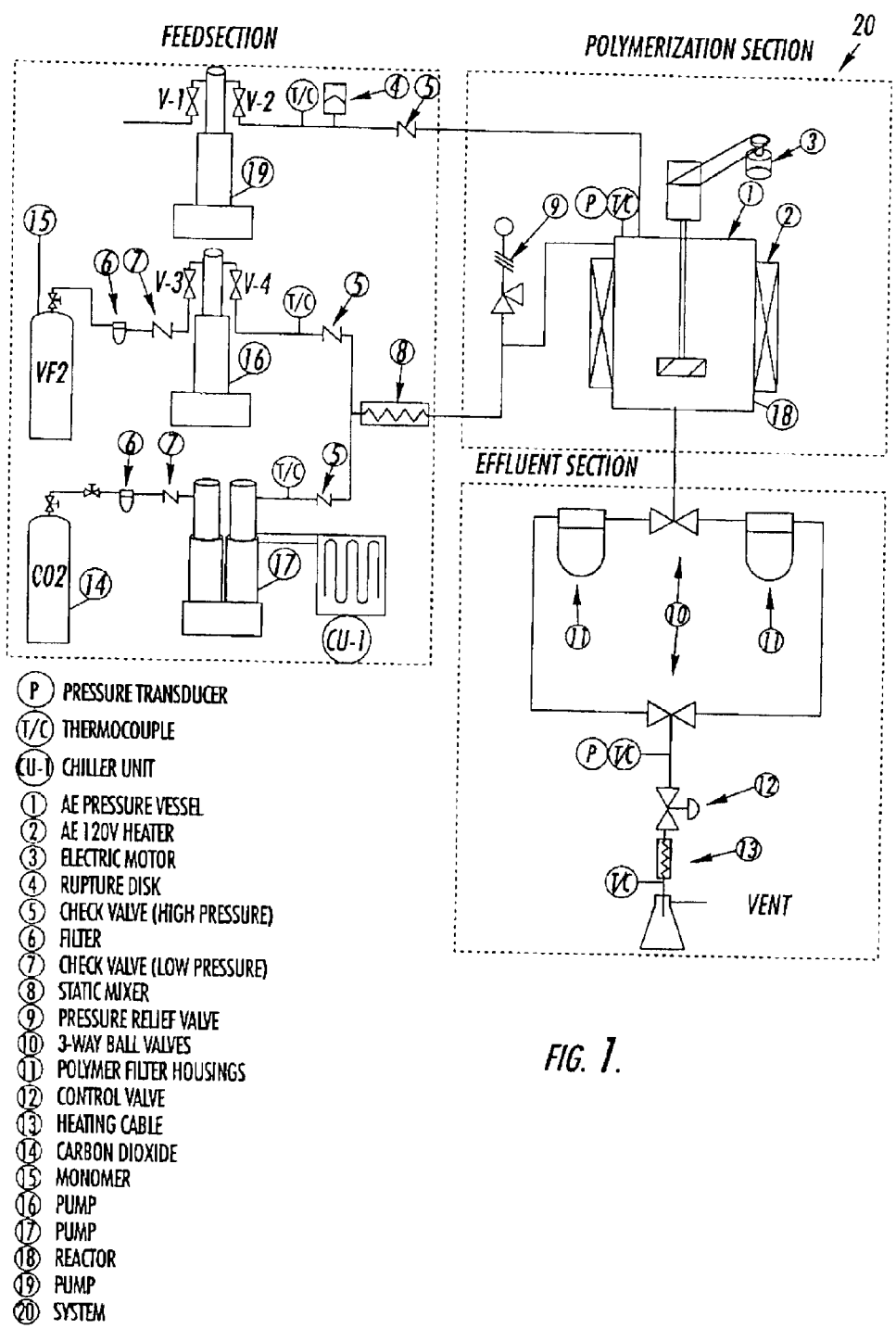
FIG. 1 is a schematic diagram of a small-scale continuous polymerization apparatus employing filter separators, without recycle of the reaction medium.

The present invention may be carried out with any reaction that produces a solid polymer product, typically as a particulate, in the reaction vessel. Example polymerization reactions, the monomers employed, and the polymers produced, include but are not limited to those described in U.S. Pat. No. 5,679,737 to DeSimone et al. and U.S. Pat. No. 5,780,565 to Clough et al. (the disclosures of all patent references cited herein are to be incorporated herein by reference).

Preferably, the monomer is a vinyl monomer. Examples of vinyl monomers are numerous and include, but are not limited to, aromatic vinyl monomers, conjugated diene monomers, unsaturated acid monomers, nitrogen-based monomers, non-aromatic unsaturated monocarboxylic ester monomers, as well as fluorinated monomers. Mixtures of any of these monomers may be employed to allow formation of copolymers, terpolymers, etc.

For the purposes of the invention, the term "aromatic vinyl monomer" is to be broadly interpreted and include, for example, aryl and heterocyclic monomers. Exemplary aromatic vinyl monomers which may be employed include, for example, styrene and styrene derivatives such as alpha-methyl styrene, p-methyl styrene, vinyl toluene, ethylstyrene, tert-butyl styrene, monochlorostyrene, dichlorostyrene, vinyl benzyl chloride, vinyl pyridine, fluorostyrene, alkoxystyrenes (e.g., paramethoxystyrene), and the like, along with blends and mixtures thereof.

Suitable conjugated diene monomers that may be used include, but are not limited to, $C_4$ to $C_9$ dienes such as, for example, butadiene monomers such as 1,3-butadiene, 2-methyl-1,3-butadiene, 2 chloro-1,3-butadiene, and the like. Blends or copolymers of the diene monomers can also be used.

A number of unsaturated acid monomers may be used in the continuous polymerization. Exemplary monomers of this type include, but are not limited to, unsaturated mono- or dicarboxylic acid monomers such as acrylic acid, methacrylic acid, itaconic acid, fumaric acid, maleic acid, and the like. Derivatives, blends, and mixtures of the above may be used.

Nitrogen-containing monomers which may be used include, for example, acrylamide-based monomers may be employed and include, for example, acrylamide, N-methylolacrylamide, N-methyolmethacrylamide, methacrylamide, N-isopropylacrylamide, N-tert-butylacrylamide, N-N'-methylene-bis-acrylamide; alkylated N butoxymethylacrylamide; and nitrites such as acrylonitrile and methacrylonitrile.

Non-aromatic unsaturated monocarboxylic ester monomers may be polymerized such as, for example, acrylates and methacrylates. The acrylates and methacrylates may include functional groups such as amino groups, hydroxy groups, epoxy groups and the like. Exemplary acrylates and methacrylates include methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate, and the like. Exemplary amino-functional methacrylates include t-butylamino ethyl methacrylate and dimethylamino ethyl methacrylate. Other monomers such as vinyl esters, vinyl halides, and vinylidene halides may also be used.

Exemplary fluoropolymers are formed from monomers which may include fluoroacrylate monomers such as 2-(N-ethylperfluorooctane-sulfonamido) ethyl acrylate ("EtFOSEA"), 2-N-ethylperfluorooctane-sulfonamido) ethyl methacrylate ("EtFOSEMA"), 2-N-methylperfluorooctane-sulfonamido) ethyl acrylate ("MeFOSEA"), 2-(N-methylperfluorooctane-sulfonamido) ethyl methacrylate ("MeFOSEMA"), 1,1'-dihydroperfluorooctyl acrylate ("FOA"), 1,1'-dihydroperfluorooctyl methacrylate ("FOMA"), 1,1',2,2'-tetrahydroperfluoroalkylacrylate, 1,1',2,2'-tetrahydroperfluoroalkyl-methacrylate and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, hexafluoropropylene, and chlorotrifluoroethylene; and fluorinated alkyl vinyl ether monomers such as perfluoro (propyl vinyl ether) and perfluoro(methyl vinyl ether).

A vast number of copolymers may be formed from any of the above monomers, the selection of which is known to one skilled in the art. In one embodiment, copolymers of maleic anhydride may be formed. Particularly preferred copolymers include, without limitation, styerene/maleic anhydride. Suitable copolymers include, without limitation, fluorinated ethylene propylene copolymer (copolymer of tetrafluoroethylene and hexafluoropropylene), perfluoroalkoxy polymer (a copolymer of tetrafluoroethylene and a perfluoropropylvinylether or perfluoromethylvinylether), sulfur dioxide alternating copolymers such as those with olefins including, without limitation, butene or norbornene, and alternating copolymers of ethylene with tetrafluoroethylene. Other preferred copolymers include, without limitation, the following:

ethylene/propylene/diene monomer
ethylene/tetrafluoroethylene
vinylidene fluoride/hexafluoropropylene
styrene/acrylonitrile
acrylonitrile/butadiene/styrene
styrene/butadiene
styrene/acrylonitrile
acrylonitrile/butadiene/styrene
styrene/polybutadiene (e.g., high impact polystyrene)
ethylene/α-olefins
ethylene/propylene/diene monomer
ethylene/vinyl acetate
ethylene/acrylate monomer/methacrylate monomer
vinyl chloride/vinylidene chloride
vinyl chloride/vinyl acetate
butadiene/acrylonitrile
ethylene/tetrafluoroethylene (TFE)
tetrafluoroethylene/hexafluoropropylene
tetrafluoroethylene/vinyl ether monomer
tetrafluoroethylene/functional vinyl ether monomer
vinylidene fluoride/tetrafluoroethylene
vinylidene fluoride/hexafluoropropylene.

Initiators that may be used in the invention are numerous and known to those skilled in the art. Examples of initiators are set forth in U.S. Pat. No. 5,506,317 to DeSimone et al., the disclosure of which is incorporated by reference herein in its entirety. Organic free radical initiators are preferred and include, but are not limited to, the following: acetylcyclohexanesulfonyl peroxide; diethyl peroxydicarbonate; diacetyl peroxydicarbonate; dicyclohexyl peroxydicarbonate; di-2-ethylhexyl peroxydicarbonate; tert-butyl perneodecanoate; 2,2'-azobis(methoxy-2,4-dimethylvaleronitrile); tert-butyl perpivalate; dioctanoyl peroxide; dilauroyl peroxide; 2,2'-azobis(2,4-dimethylvaleronitrile); tert-butylazo-2-cyanobutane; dibenzoyl peroxide; tert-butyl per-2-ethylhexanoate; tert-butyl permaleate; 2,2-azobis (isobutyronitrile); bis(tert-butylperoxy) cyclohexane; tert-butyl peroxyisopropylcarbonate; tert-butyl peracetate; 2,2-bis(tert-butylperoxy) butane; dicumyl peroxide; ditert-amyl peroxide; di-tert-butyl peroxide; p-methane hydroperoxide; pinane hydroperoxide; cumene hydroperoxide; and tert-butyl hydroperoxide. Combinations of any of the above initiators can also be used.

Additionally, the invention may accommodate catalyzed reactions such as those employing, without limitation, transition metal catalysts including, for example, iron, nickel, and palladium. If desired, these catalysts can be used in combination with ligands such as monodentate, bidentate, or tridentate ligands, the selection of which is known in the art. Examples of such ligands can be found in U.S. Pat. No. 6,176,895, which was filed Nov. 4, 1998 and issued Jan. 23, 2001, the disclosure of which is incorporated herein by reference in its entirety.

Thus, in accordance with the invention, example polymers that may be used in the present invention, and example initiators that may be used for such polymers, include but are not limited, those formed from any of the above monomers.

In one preferred embodiment, vinylidene fluoride (VF2) and acrylic acid (AA) are polymerized, alone or in combination, utilizing diethyl peroxydicarbonate (DEPDC) as the free-radical initiator for VF2, and 2,2'-azobis(isobutyronitrile) (AIBN) as the free-radical initiator for AA. The initiator may be one that provides the end groups for the polymer chain, and can provide stable end groups to the polymer if desired. In general, the invention may encompass polymerizing monomers not limited to those set forth herein, either by themselves to form homopolymers, or in combination to form, for example, copolymers or terpolymers.

The reaction vessel used to carry out the present invention may be in various forms or configurations. For example, in one embodiment, the reaction vessel may be a stirred or mechanically agitated reaction vessel, more preferably a stirred reaction vessel that behaves as an "ideal" stirred tank reactor (CSTR), or a continuous loop reactor, more preferably a continuous loop reactor that behaves as an "ideal" stirred tank reactor. By "ideal stirred tank reactor" is meant one which sufficiently approximates for commercial conditions a state in which the reactor contents are perfectly mixed so that the system properties are uniform throughout (e.g., for reactor design and analysis purposes). It should be understood by one skilled in the art that an ideal stirred tank reactor may encompass physical configurations other than those described herein. See, e.g., C. Hill, *An Introduction to Chemical Engineering Kinetics and Reactor Design*, page 270 (1977). Another definition of an ideal reactor (e.g., CSTR) is a reactor whose dimensionless exit age distribution function $E(\Theta)$, reaches a maximum value in the dimensionless time interval between about $\Theta=0$, 0.05, or 0.10 and about $\Theta=0.20$, 0.30, and 0.50 and then declines monotonically after reaching the maximum value. In a preferred embodiment of an ideal CSTR, the cumulative exit age distribution function, F, has a value between about 0.45 or 0.54 and 0.60 or 0.70 when $\Theta=1$. In a preferred embodiment, the dimensionless exit age distribution for an ideal CSTR reaches its maximum at $\Theta=0$ and has a value of $\Theta=0.63$ when $\Theta=1$. For the purposes of the invention, $\Theta$ is defined as the actual time divided by the reactor space time, i.e., the time elapsed in processing one reactor volume of feed at specified conditions. It should be appreciated that other embodiments are certainly encompassed within the scope of the invention. See e.g., O. Levenspiel, *Chemical Reaction Engineering*, $3^{rd}$ Ed., pp. 257–269, John Wiley & Sons, New York, N.Y., (1999).

In a particular embodiment of the invention, an apparatus for the continuous polymerization of a monomer in carbon dioxide comprises a continuous reaction vessel; at least one inlet line connected to the reaction vessel; an effluent line connected to the reaction vessel; an inlet control valve connected to the effluent line; a first separator and a second separator connected to the inlet control valve, the control valve switchable between (i) a first position in which the first separator is in fluid communication with the effluent line while the second separator is not, and (ii) a second position in which the second separator is in fluid communication with the effluent line while the first separator is not; and a return line connecting each of the first and second separators to the reaction vessel so that liquid or supercritical reaction medium is returned to the reaction vessel from the separators while solid polymer is retained in the separator; and control means operatively associated with the return line for maintaining the reaction medium as a liquid or supercritical fluid in the first and second separators; whereby effluent from the continuous reaction vessel can be (i) continuously passed through the first separator while polymer may be removed from the second separator by switching the inlet control valve to the first position, and (ii) continuously passed through the second separator while polymer may be removed from the first separator by switching the inlet control valve to the second position. The separators may be filter separators or cyclone separators, preferably filter separators. In certain embodiments, a single cyclone separator normally operates continuously, but a plurality operating in parallel can allow for one to be taken off line to be cleaned out, etc. Other features as set forth herein may also be included.

Figure 17:
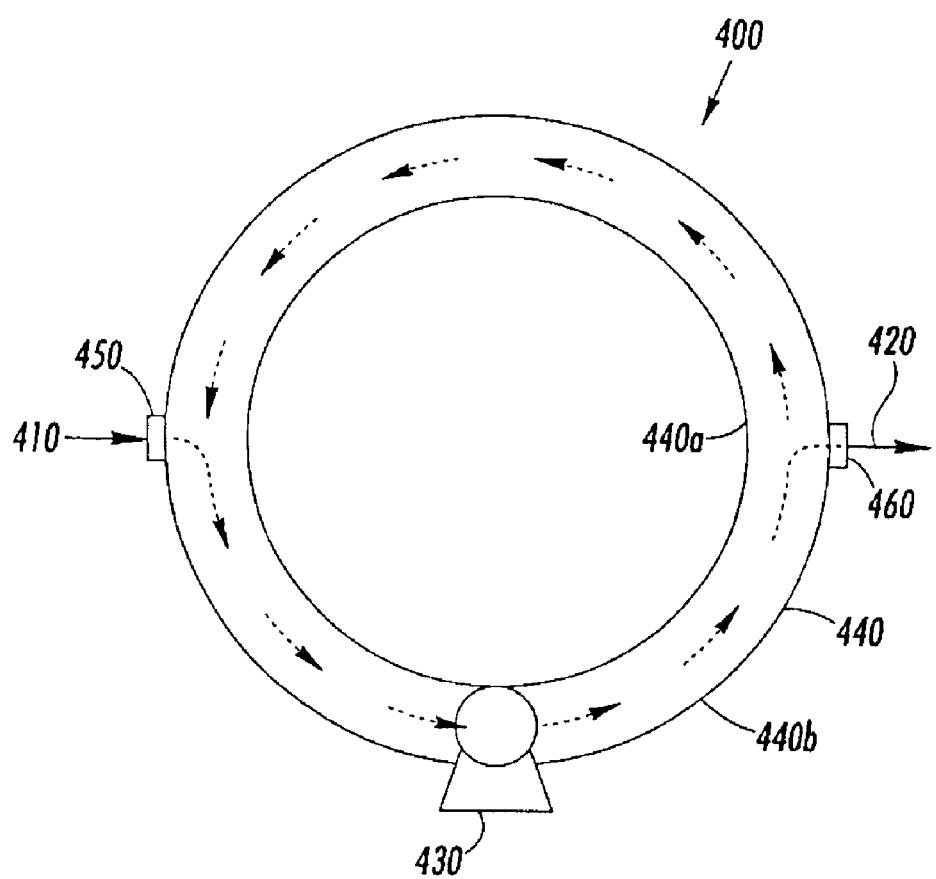
FIG. 17 is a schematic diagram of a continuous loop reactor which may be employed in accordance with the invention.

As alluded to above, a continuous loop reactor can be employed and an embodiment of an example of such a system is depicted as 400 in FIG. 17. An inlet stream 410 comprising liquid or supercritical carbon dioxide, monomer, and initiator passes through an appropriate opening (e.g., valve, fitting, or the like) 450 and enters the reaction vessel 440. The reaction vessel comprises inner and outer walls 440*a* and 440*b* respectively, and in this particular embodiment is in the shape of a loop. Pump 430 facilitates the circulation of the inlet stream throughout the reaction vessel 440, and ensures that the ingredients are well mixed. In a preferred embodiment, as long as the flow rate of the inlet stream 410 is small compared to the flow rate of the fluid in the loop of the system, the system properties will not vary significantly from point-to-point in the reaction vessel 440, i.e., will be uniform throughout. Thus, the performance of the loop reactor will be essentially the same as a stirred or mechanically agitated reactor having system properties that do not vary significantly from point-to-point throughout the reactor. Preferably, the reaction vessel 440 behaves similar to an ideal stirred tank reactor as described in detail herein. As appreciated by one skilled in the art, the reaction vessel 440 may contain mixers, heaters, etc. to enable the ingredients to be maintained at specified temperature and pressure conditions. The monomers react in the reaction vessel 440 to form solid polymer particles. An opening 460 (e.g., a back pressure valve) allows the contents of the reaction vessel 440 to pass out of the vessel. Resulting effluent 460 then may be transported to other downstream processing features (e.g., separators and recycling systems) as set forth herein. Additionally, it should be appreciated that the continuous loop reactor 400 may include any of the apparatus features described in the specification, even though these are features may not be depicted in FIG. 17.

Figure 13:
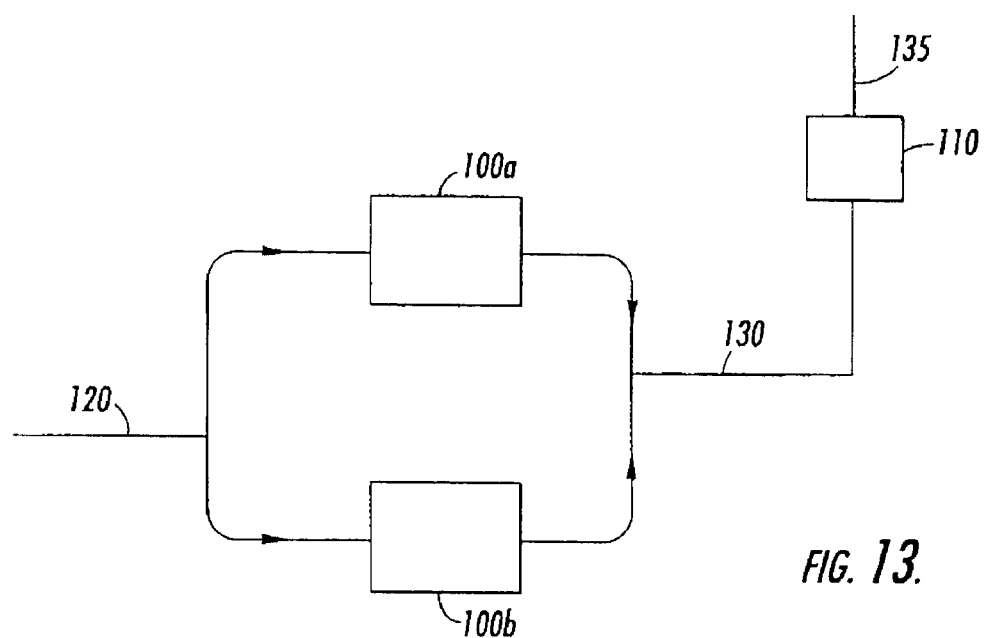
FIG. 13 is a schematic diagram of a separator in the form of a plurality of parallel filters that allows for collection of polymer and recycle of reaction medium in accordance with a method of the invention.

FIG. 13 refers to an embodiment in which the separator is present in the form of a plurality of parallel filters, in this example, denoted as 100*a* and 100*b*. Additional filters may be employed as deemed necessary by one skilled in the art. In this embodiment, effluent stream 120 from the continuous reaction vessel is passed into one of the filters 100*a* or 100*b* by virtue of the flow being diverted to the desired filter. Polymer is collected in either of the filters and the resulting outgoing stream 130 comprises primarily liquid or supercritical fluid, unreacted initiator (if any), and unreacted monomer (if any). Stream 130 is then repressurized by compressor 110 and the resulting stream 135 is recycled back to the reaction vessel. Although not shown, a purge is preferably present between the filters 100*a* and 100*b* and the compressor 110 to bleed off a portion of the effluent. When a sufficient amount of polymer is collected on the filter such that the pressure drop becomes undesirably high across the filter, the flow is diverted such that stream 120 passes through the previously-unused filter. Polymer is then collected from the offline filter. The above procedure may be repeated as many times as deemed appropriate by one skilled in the art.

Figure 14:
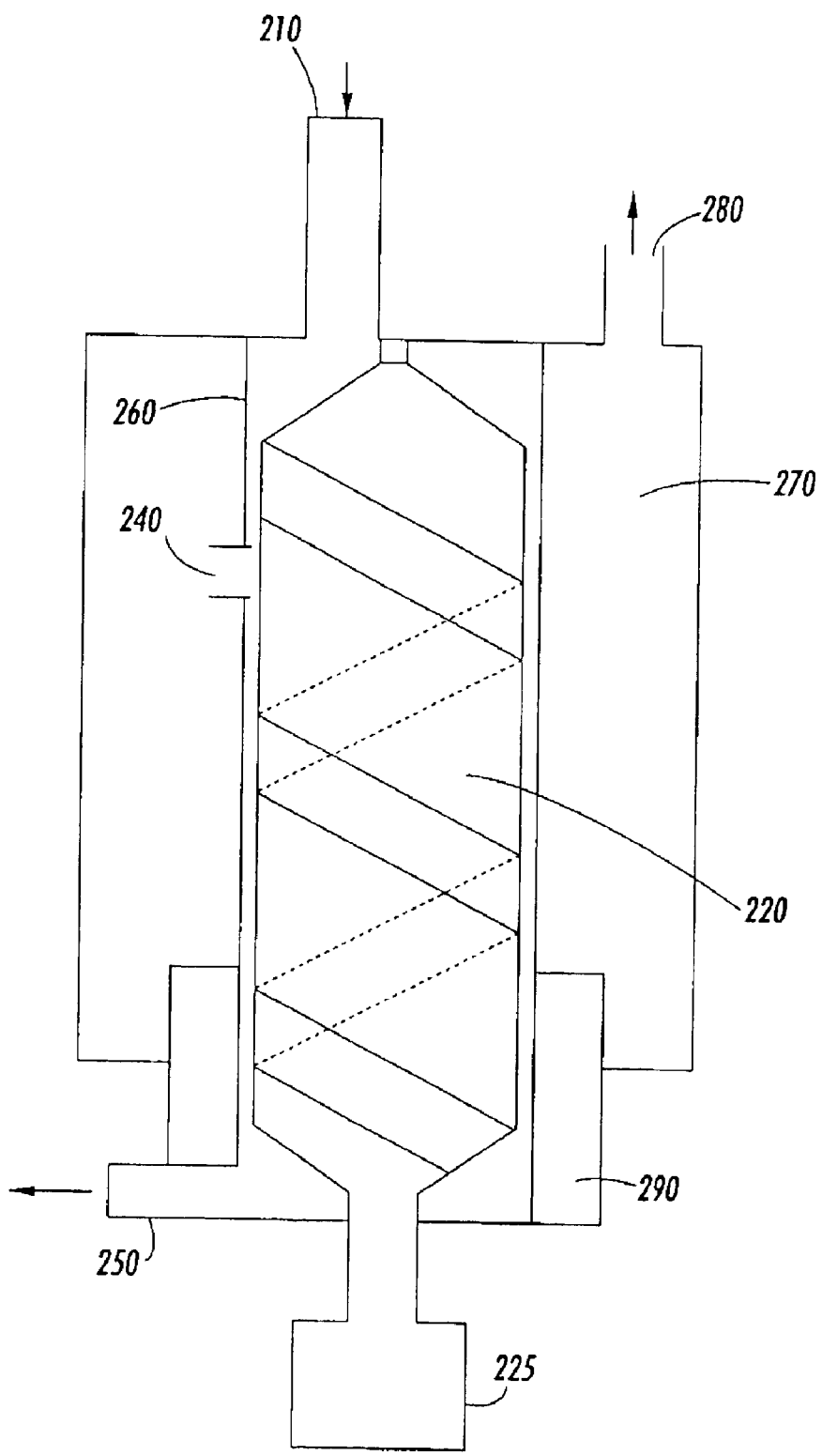
FIG. 14 is a schematic diagram of a separator in the form of a continuously stirred device that allows for collection of polymer and recycle of reaction medium in accordance with a method of the invention.

FIG. 14 illustrates another embodiment of a separator 200 which may be used in accordance with the invention. Effluent stream 210 containing polymer, liquid or supercritical fluid, unreacted monomer (if any), and unreacted initiator (if any) enters the separator. During the operation of the separator 200, liquid or supercritical fluid, unreacted monomer (if any), and unreacted initiator (if any) passes through pores 240 in the inside walls 260 of the separator. The walls 260 may be formed from a variety of materials that are porous including, without limitation, sintered metal, ceramic, etc. Upon passing through the walls 260, the fluid stream enters chamber 270 and leaves this chamber through exit line 280. The stream leaving through 280 may be disposed of as deemed appropriate. As an example, the stream may be recycled to the reaction vessel. Advantageously, the size of the pores are such that polymer does not pass through, but instead collects on the inside surface of the walls 260.

A rotating device 220 with drive 225 may be present in various configurations is present in the separator and serves to continuously remove the polymer that collects on the inside surface of the walls 260. In this embodiment, the rotating device 220 is present in the form of a screw, although other types of devices can be employed within the scope of the invention. The screw 220 removes the polymer from the wall 260 and conveys the polymer through the bottom 250 of the separator. A solid wall 290 surrounds the bottom of the screw as depicted in FIG. 14. In order to minimize loss of reaction medium and unreacted monomer and initiator through bottom 250, the screw 220 is designed to melt the polymer and form a seal in the screw 220. The molten polymer is conveyed through exit 250 from the high pressure region of the device to an essentially ambient pressure region, where it is cooled and processed by techniques known to one skilled in the art. Thus, the separator 200 may operate in a continuous fashion.

Figure 15:
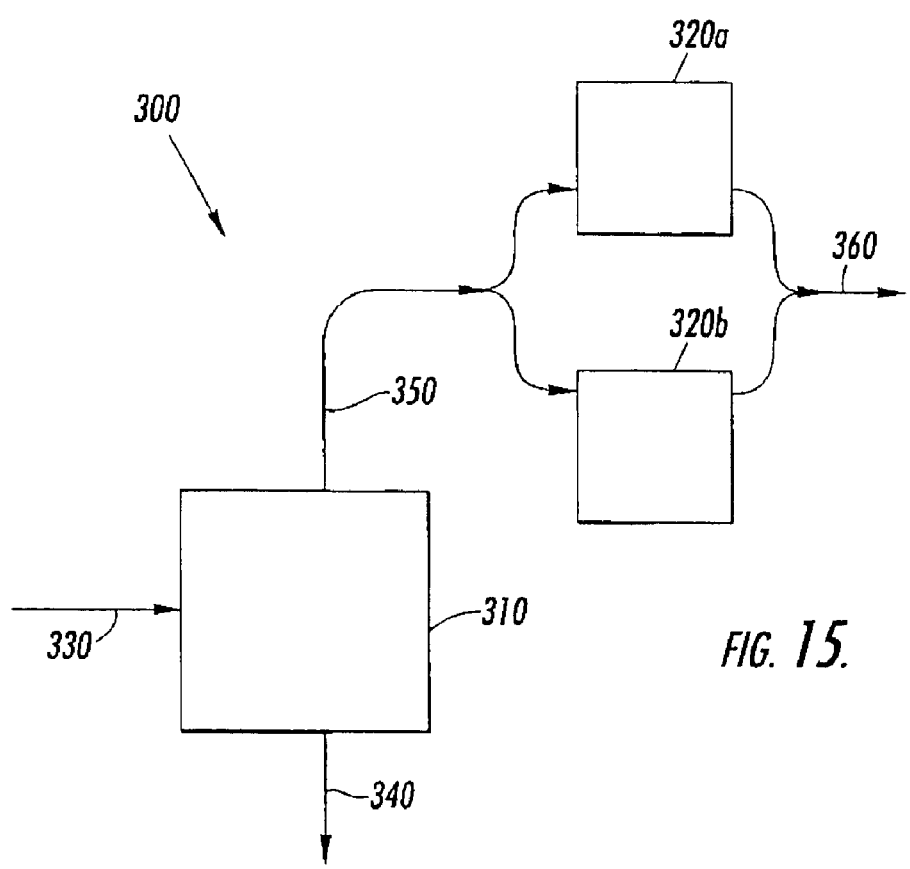
FIG. 15 is a schematic diagram of a separator in the form of a cyclone in combination with a filter which serves to separate polymer from the reaction medium, allowing for the reaction medium to be recycled.

A preferred embodiment for a cyclone-type separator 300 is depicted in FIG. 15. In this embodiment, cyclone 310 is in fluid communication with parallel filters 320a and 320b positioned downstream of the cyclone 310. Incoming effluent stream 330 containing liquid or supercritical fluid, unreacted monomer (if any), and unreacted initiator (if any) enters the cyclone 310 which results in the formation of a bottom stream 340 containing a relatively high percentage of polymer and a top stream 350 containing primarily liquid or supercritical fluid, unreacted monomer (if any), and unreacted initiator (if any), along with polymer. The top stream 350 is diverted to either of filters 320a or 320b in a manner described hereinabove (e.g., see FIG. 13). This arrangement allows for the removal of polymer from stream 350 such that the resulting exit stream 360 contains a sufficiently low level of polymer such that it is suitable for recycle to the reaction vessel, if so desired. Polymer may then be collected from any of the filters 320a and 320b using appropriate techniques.

In one embodiment of the invention, the method for carrying out the continuous polymerization of a monomer in carbon dioxide comprises the steps of: (a) providing an apparatus including a continuous reaction vessel, a first separator, and a second separator; (b) carrying out a polymerization reaction in the reaction vessel by combining a monomer, an initiator, and a carbon dioxide reaction medium therein, wherein the reaction medium is a liquid or supercritical fluid, and wherein the reaction produces a solid polymer product in the reaction vessel; then (c) withdrawing a continuous effluent stream from the reaction vessel during the polymerization reaction, passing at least a portion of the effluent stream through the first separator while maintaining the effluent stream as a liquid or supercritical fluid and separating the solid polymer therefrom; and then returning at least a portion effluent stream to the reaction vessel; and then (d) withdrawing a portion of the continuous effluent stream from the reaction vessel during the polymerization reaction, passing the effluent stream through the second separator while maintaining the effluent stream as a liquid or supercritical fluid and separating the solid polymer therefrom, and then returning at least a portion of the effluent stream to the reaction vessel, while concurrently removing the solid polymer separated in the first separator during the withdrawing step (c). Preferably, step (d) is followed by the step of: (e) repeating the withdrawing step (c) while concurrently removing the solid polymer separated in the second separator during the withdrawing step (d). Preferably, an initiator is employed in step (b). Preferably, a purge is located in a return polymerization line between the separator(s) and the reaction vessel so as to remove an amount of the effluent stream as deemed appropriate by one skilled in the art. In these preferred embodiments, the at least a portion of effluent that is returned to the reaction vessel is typically a fraction less than one.

Any suitable system or apparatus may be used as the control means for maintaining said reaction medium as a liquid or supercritical fluid in the separator and the return line (and preferably at a pressure not more than 50 or 100 psi different from the pressure in said reaction vessel during polymerization of monomer therein). Examples include, but are not limited to, charging fluid into the system wherein the charging may be controlled through the use of a computer which may be analog or digital, removing reaction medium from the system wherein the removing may be controlled through the use of a computer which may be analog or digital, adding heat to the system, wherein adding the heat may be controlled through the use of a computer which may be analog or digital, removing heat from the system, wherein removing the heat may be controlled through the use of a computer which may be analog or digital, or pumping the reaction medium, wherein pumping may be controlled through the use of a computer which may be analog or digital.

The present invention is explained in greater detail in the following non- limiting Examples.

EXAMPLE 1

Chain-Growth Precipitation Polymerizations

The experimental system consists of an intensely mixed, continuous stirred tank reactor (CSTR), followed by two high-pressure filters in parallel, where the polymer is collected. This method is widely applicable to various monomers in heterogeneous polymerizations, both with and without surfactants. Herein we report on our experiments with vinylidene fluoride (VF2) performed at a temperature of 75° C., a pressure of 275 bar, and at residence times from 15 to 50 minutes. The poly(vinylidene fluoride) polymer (PVDF) was collected as a dry "free-flowing" powder, and has been characterized by gel permeation chromatography (GPC).

Materials. VF2 monomer was donated by Solvay Research, Belgium and SFE/SFC grade $CO_2$ was donated by Air Products & Chemicals, Inc. All other chemicals were obtained from Aldrich Chemical Company.

Initiator Synthesis. The DEPDC (diethylperoxydicarbonate) initiator was synthesized as previously reported, using water as a reaction medium and extracting the initiator into Freon 113 (Mageli, O. L.;

Sheppard, C. S.; In *Organic Peroxides, Vol. I*, Swern D, Eds.; Wiley-Interscience, New York, 1970 pp. 1–104; Hiatt, R. In *Organic Peroxides, Vol. II*, Swern D, Eds.; Wiley-Interscience, New York, 1970 pp. 799–929; Strain, F.;. Bissinger, W. E.; Dial, W. R.; Rudolf, H.; DeWitt, B. J.; Stevens, H. C.; Langston, J. H. *J. Am.Chem.Soc.* 1950, 72, 1254–1263). All manipulations of the initiator were performed in an ice bath and the final product was stored in a cold chest at −20° C. The iodine titration technique, ASTM Method E 298–91, was utilized to determine the concentration of active peroxide in the solution.

Polymerization Apparatus. A schematic of the equipment used for the polymerization is shown in FIG. 1. Carbon dioxide 14 and monomer 15 are pumped continuously by Isco syringe pumps 16 and 17 in constant flow mode and mixed by an 8-element static mixer 8, before entering the reactor 18. The initiator solution is also pumped continuously by an Isco syringe pump 19 in constant flow mode, and enters the reactor 18 as a separate stream. All feed lines have check-valves to prevent back-flow, thermocouples, and rupture disks for safety in case of overpressurization. The CSTR is an 800 mL Autoclave Engineers (AE) autoclave with a magnedrive to provide mixing of ingredients with an AE dispersimax impeller. The reactor is heated by a furnace, has an installed pressure transducer (Druck) and a thermowell containing a thermocouple (Omega Engineering). FIG. 1 depicts a continuous stirred tank reactor 18. It should be appreciated that other reactors can be employed in the system depicted in FIG. 1 such as, without limitation, a continuous loop reactor as referred to herein.

The effluent stream leaves the CSTR 18 through the bottom, and is directed by a 3-way ball-valve 10 (HIP) to one of two 280 mL filter housings (Headline) containing 1 $\mu$m filters where the solid polymer is collected. Unreacted monomer, initiator and $CO_2$ pass through the filters and flow through a heated control valve 12 (Badger). This control valve functions as a back-pressure regulator, which controls the reactor pressure at the desired set-point. The effluent stream passes through a water bath to remove unreacted peroxide, while the gaseous $CO_2$ and monomer is safely vented into a fume-hood. Very low levels of polymer were found in the water bath, so essentially all precipitated polymer was collected on the 1 $\mu$m filters.

The entire polymerization apparatus 20 was computer controlled and monitored. The supervisory control and data-acquisition (SCADA) system consists of National Instruments BridgeVIEW software and Fieldpoint input/output modules. Input modules were utilized for reading pressure transducers and thermocouples. Output modules were utilized to control the reactor furnace, and the control valve. All control functions were performed utilizing PID algorithms.

Polymerization Procedure. The reactor was first heated to the desired temperature and the agitator was set to 1800 revolutions per minute (RPM). The system was then purged with $N_2$. After about 2 hours, the control valve was closed and the system was pressurized with $CO_2$ to the desired reactor pressure. The desired $CO_2$ flow rate was set and the temperature and pressure of the system were allowed to stabilize. Temperature control was ±0.2° C., while pressure control was ±1 bar. When the system had stabilized, the initiator flowrate was set and initiator was allowed to flow through the system for at least 3 residence times in order to remove impurities. Monomer flow was then started. At least 5 residence times after the introduction of monomer, with the CSTR at steady-state, the 3-way ball valve was switched and the stream exiting the CSTR was fed to the empty filter/collector, where steady-state polymer was collected for between 30 and 60 minutes. After this time, the ball valve was switched so that effluent flowed to the original collector, and the monomer and initiator feed streams were stopped so that only pure $CO_2$ was fed through the system for cleaning. The system was finally vented and the polymer collected and weighed.

Results and Discussion. We have developed and demonstrated a continuous, once through system for precipitation polymerizations in $scCO_2$, as shown in FIG. 1. Table 1 shows the reactor conditions for several experiments with VF2 polymerization initiated by DEPDC. Table 2 provides the polymerization results and GPC data for the poly (vinylidene fluoride) (PVDF) polymer produced in these experiments. The conversion of VF2 in these polymerizations (Conversion=moles of monomer reacted/moles of monomer fed) ranged from 7 to 24%. Unlike a batch polymerization, high conversions are not required for a continuous system, as the monomer is recycled. The rate of polymerization ($R_p$) for the CSTR system reached a maximum of $19 \times 10^{-5}$ mol/L·s, at a feed monomer concentration of 1.7 mol/L. This rate will increase as the concentration of monomer is increased. In the batch polymerization of VF2 in $scCO_2$, the average $R_p$ at 3.0 M monomer concentration, using an acyl peroxide initiator at 65° C., was $0.2 \times 10^{-5}$ mol/(L·s) (Kipp, B. PhD Thesis, University of North Carolina-Chapel Hill. 1998).

TABLE 1

Reactor Conditions for Polymerization of Vinylidene Fluoride.

| Run # | Pressure (bar) | Temp (° C.) | $\tau$* (min) | $M_{CO_2}$** (g/min) | $m_{initiator}$** (mg/min) | $m_{VF_2}$** (g/min) | $[VF2]_{INLET}$ (mol/L) |
|---|---|---|---|---|---|---|---|
| 1 | 276 | 75 | 21 | 26.4 | 4.9 | 1.9 | 0.77 |
| 2 | 276 | 75 | 28 | 19.9 | 14.7 | 1.4 | 0.77 |
| 3 | 276 | 75 | 21 | 26.5 | 19.5 | 1.9 | 0.77 |
| 4 | 276 | 75 | 21 | 26.5 | 32 | 1.9 | 0.77 |
| 5 | 276 | 75 | 14 | 39.8 | 29.2 | 2.0 | 0.77 |
| 6 | 276 | 75 | 20 | 26.5 | 19.6 | 3.8 | 1.45 |
| 7 | 276 | 75 | 22 | 26.5 | 19.7 | 0.94 | 0.40 |

*$\tau$ = reactor residence time = reactor volume/total volumetric flow rate
**m = mass flow rate

TABLE 2

Polymerization Results and Polymer Characterization Data for PVDF.

| Run # | X (%)* | $R_p$ (mol/L·s) ($\times 10^5$)** | $M_n$ ($\times 10^{-3}$) | $M_w$ ($\times 10^{-3}$) | $M_w/M_n$ |
|---|---|---|---|---|---|
| 1 | 6.9 | 4.0 | 20 | 33 | 1.7 |
| 2 | 18.4 | 7.9 | 15 | 21 | 1.4 |
| 3 | 18 | 10.3 | 14 | 21 | 1.5 |
| 4 | 24 | 13.7 | 12 | 17 | 1.4 |
| 5 | 11 | 9.5 | 18 | 45 | 2.5 |
| 6 | 16 | 16.7 | 29 | 60 | 2.1 |
| 7 | 20 | 5.9 | 10.5 | 15 | 1.4 |

*Conversion (X) was determined gravimetrically from steady-state polymer collection.
**Rate of polymerization ($R_p$) was calculated by $R_p = ([VF2]_{INLET} - [VF2]_{OUTLET})/\tau$ The GPC results indicated that the molecular weight distributions (MWDs) were unimodal.

Conclusions. This example describes a system for the continuous polymerization of various monomers in $scCO_2$. The feasibility of the continuous precipitation polymerization of VF2 and AA has been demonstrated using an intensely-agitated, continuous stirred tank reactor (CSTR).

Rates of polymerization of VF2 in the CSTR are significantly higher than the average rates of batch polymerization, under similar conditions.

EXAMPLE 2

Continuous Precipitation Polymerization of Vinylidene Fluoride in Supercritical Carbon Dioxide: Comparison of Experimental to Model $R_p$ This example describes the heterogeneous polymerization of vinylidene fluoride. Poly(vinylidene fluoride) (PVDF) is a semicrystalline polymer and is produced commercially by either emulsion or suspension batch techniques at polymerization conditions of between 10–200 bar at temperatures from 10–130° C. (Dohany, J. E. and J. S. Humphrey, *Vinylidene Fluoride Polymers, in Encyclopedia of Polymer Science and Engineering*, H. F. Mark, et al., Editors. 1989, Wiley: New York. p. 532–548; Russo, S., M. Pianca, and G. Moggi, *Poly(vinylidene fluoride)*, in *Polymeric Materials Encyclopedia*, J. C. Salamone, Editor. 1996, CRC: Boca Raton. p. 7123–7127). The emulsion technique requires that the final polymer latex be first coagulated, thoroughly washed, then spray-dried before a free-flowing powder is obtained. The suspension technique requires separation of the polymer from the water phase, thorough washing, then drying. Vinylidene fluoride monomer normally contains no inhibitors and PVDF polymer does not require additives for stabilization during melt-processing, thereby qualifying this polymer for applications such as ultrapure water systems where high purity materials are required. Due to the inherent disadvantages of the traditional techniques for preparing PVDF, such as additives required for polymerization and difficult to treat waste streams, a continuous environmentally-friendly process is attractive.

This example also describes the kinetics and mechanism of VF2 polymerization initiated by the organic peroxide, diethyl peroxydicarbonate (DEPDC), using the novel highly agitated continuous system of the present invention. Not intending to be bound by theory, the information gained in this work is useful for developing predictive kinetic models that can describe the rate of polymerization (RP) and molecular weight distribution (MWD) for experimental conditions of interest. It should be noted that until now, there has been no systematic investigation of the kinetics of free-radical polymerizations carried out in $CO_2$, either in batch, or using a CSTR. As well, very little polymerization data is present in the literature on the PVDF system in particular, and fluorinated monomers in general. We report here on experiments that have been performed at stirring rates from 1300–2700 rpm, initiator inlet concentrations ranging from 8–50 ($\times 10^{-4}$) M, monomer inlet concentrations ranging from 0.4–3.5 M, temperatures ranging from 65–80° C. (at constant $CO_2$ densities of 0.74 g/ml), and residence times from 10 to 50 minutes. The polymer was collected in all cases as a dry "free-flowing" powder, and has been characterized by gel permeation chromatography (GPC).

1. Materials and Methods.

Materials. VF2 monomer was provided by Solvay Research, Belgium and SFE/SFC grade $CO_2$ was provided by Air Products & Chemicals, Inc. All other chemicals were obtained from Aldrich Chemical Company.

Initiator Synthesis. The DEPDC initiator was synthesized as previously reported, using water as the reaction medium and extracting the initiator into Freon 113 (HPLC Grade) (Mageli, O. L. and C. S. Sheppard, *Organic Peroxides*, ed. D. Swern. Vol. I. 1970, New York: Wiley-Interscience. 1–104.; Hiatt, R., *Organic Peroxides*, ed. Swern D. Vol. II. 1970, New York: Wiley-Interscience. 799–929). All manipulations of the initiator were performed in an ice bath and the final product was stored in a cold chest at −20° C. The iodine titration technique, ASTM Method E 298-91, was utilized to determine the concentration of active peroxide in the solution.

Polymerization Apparatus. The equipment and the polymerization procedure is described in Example 1 above. Modifications to the system for the instant example include: a) replacing the reactor furnace with a temperature jacket (Autoclave Engineers) through which heating/cooling fluid is circulated to provide superior temperature control for the reactor; b) addition of a gas chromatograph (SRI 8610C) which samples the exit stream (after filtration) directly through a HPLC valve (Valco). The GC column is a silica column while the oven temperature was isothermal at 55° C.; and c) addition of a counter-current heat exchanger on the effluent line of the CSTR to cool the exiting polymer stream to ambient temperature.

GPC. All gel permeation chromatography (GPC) measurements of the PVDF polymer samples were performed on a Waters-Alliance HPLC system with 2×HR5E and 1×HR2E columns using N,N-Dimethylformamide (DMF) modified with LiBr 0.1M. The following conditions were adopted: 1) column compartment temperature at 40° C., 2) flow rate of mobile phase, 1 ml/min. 3) sample injection volume, 100 μl, 4) no sample filtering 5) sample concentration of 0.1 wt % in mobile phase (samples are conditioned in mobile phase at 60° C. for one hour but can be injected at room temperature). Calibration of the GPC was performed at 40° C. directly with a calibration curve obtained using narrow MWD PMMA standards purchased from Polymer Laboratories Ltd. The Mark-Houwink constants for the universal calibration curve were K=1.32 $10^{-4}$, a=0.674 for PMMA and K=1.14 $10^{-5}$, a=0.97 for PVDF.

Polymerization Control. Polymerization takes place in our continuous system in a highly-agitated CSTR, where $CO_2$, VF2 and DEPDC are continuously fed to the reactor and mixed under isothermal conditions, while the produced heterogeneous polymer, i.e. PVDF, as well as $CO_2$ and unreacted VF2 and DEPDC, continuously leave the reactor. No recycle is presently implemented (both for simplicity and to prevent the buildup of impurities). Control of the reactor temperature (T) and pressure (P) was excellent during a polymerization, varying within very close tolerances (T=±0.2° C. and P=±1 bar). Feed rates of initiator and monomer from the syringe pumps are ±0.1%.

Attainment of Steady-State. In order to determine the attainment of steady-state (SS), both gas-chromatograph (GC) analysis and varying the polymer collection time was used. The $CO_2$ and VF2 peaks could be separated by GC. Calibration of the GC was performed using $CO_2$ and VF2 flowrates determined by the syringe pumps. Densities of VF2 and $CO_2$ in the cooled syringe pumps (cooling the syringe pumps by chiller circulators allows for easier condensing of liquified gases) and heated reactor were determined from data provided by Solvay for VF2 (Peng-Robinson equation of state) while $CO_2$ densities were determined from US National Institute of Standards and Technology (NIST) data.

2. Results and Discussion

Figure 2:
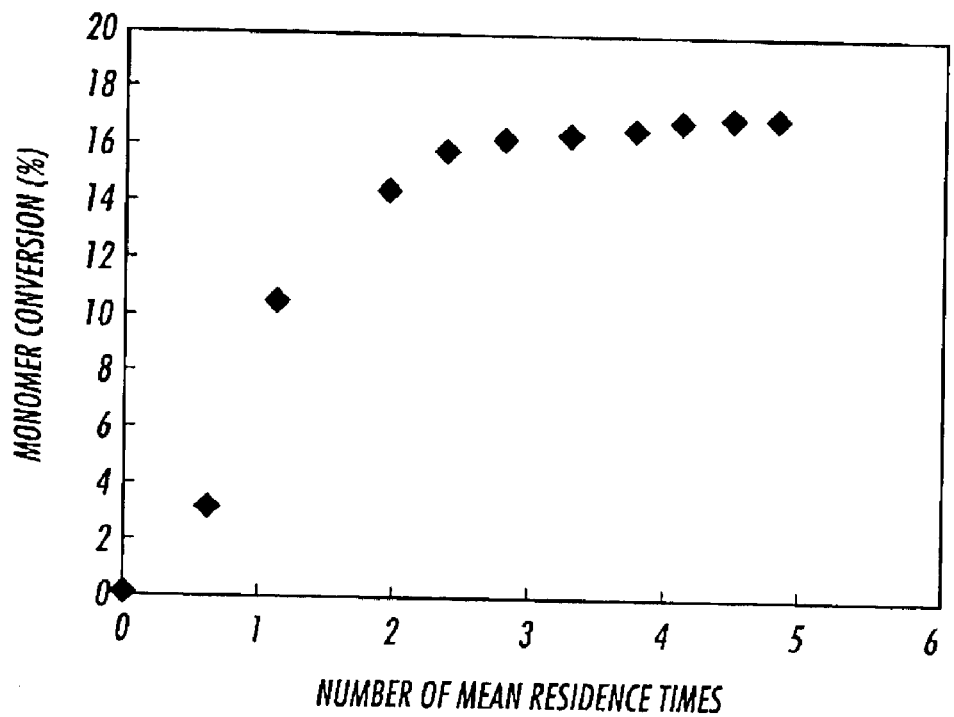
FIG. 2. GC Analysis for the Attainment of Steady State for Polymerization of VF2. The points are experimental data. The polymerization conditions were P=276 bar, T=75° C., $v_{CO2}$=26 g/min, $[VF2]_{INLET}$=0.77 M, $[DEPDC]_{INLET}$=3 mM, and τ=21 minutes.

Attainment of Steady-State. FIG. 2 shows a GC analysis used to determine the attainment of steady-state for a typical polymerization run. In this figure the effluent VF2 concentration is measured as a function of time, in units of the reactor residence time, τ. For a typical polymerization run, steady-state was attained after about 5 τ. Polymer collection was normally initiated after 5 τ's by switching to the SS collector. After SS polymer collection was complete, the exit stream was turned back to the non-SS filter such that SS polymer was not mixed with non-SS polymer. After the reactor had been on stream for at least 5 τ's, collection of polymer for varying time lengths was found to give identical polymer weight/collection time ratios, confirming the results from the GC analysis.

Phase Behavior. Under the experimental conditions studied, the monomer, VF2 (HFC-1132a), and the free-radical initiator, DEPDC, were found to be miscible with $CO_2$ while the formed polymer powder, PVDF, is imiscible in $CO_2$ or in VF2, for all experimental ranges studied (by off-line studies in a high-pressure view cell)(Lora, M., J. S. Lim, and M. A. McHugh, *Comparison of the solubility of PVF and PVDF in Supercritical CH2F2 and CO2 and in CO2 with Acetone, Dimethyl Ether, and Ethanol*. J. Phys. Chem. B., 1999. 103(14): p. 2818–2822). This phase behavior defines a precipitation polymerization. As mentioned in Example 1, all formed polymer powder was collected by the 1 μm filters, with very low levels of polymer being found in the exit water bath. After each reaction, the inside of the reactor was normally very lightly coated with powder. The thin powder layer was always dry, not tacky, and could easily be wiped off the reactor walls. No sticky film formation was observed and the wall temperature of the reactor never exceeded the melting point of the polymer. Under these experimental conditions, no evidence was obtained that the powder was building up on the reactor walls, or in the reactor, as the powder layer was always very thin and experiments varying the collection time of the steady-state stream gave identical polymer weight/collection time ratios.

RTD and Initiator Decompositon Studies. The residence time distribution (RTD) of the experimental reactor was determined as well as the decomposition kinetics of the DEPDC free-radical initiator. For all conditions studied, the RTD of the reactor was found to model that of an ideal CSTR. These experiments were performed in pure $CO_2$, under typical experimental conditions of T and P, without the presence of any polymer powder.

Table 3 provides the initiator decomposition rate constants for DEPDC in $scCO_2$. It should be noted that no significant solvent dependence was observed for decomposition of DEPDC in $scCO_2$ compared to the literature value that used radical scavenging 2,2'-Oxydiethylene bis(allyl carbonate) as solvent (Strain, F., et al., *Esters of Peroxycarbonic Acids*. J. Amer. Chem.Soc., 1950. 72: p. 1254–1263). The initiator efficiency found, f=0.6, is also very typical for an organic peroxide (Hamielec, A. E. and H. Tobita, *Polymerization Processes. Ullmann's Encyclopedia of Industrial Chemistry*. 1992. 331). For the kinetic analysis of PVDF polymerization presented in this paper, the $k_d$'s from Table 3 were used, while f=0.6 was used for the initiator efficiency for all temperatures studied.

TABLE 3

Initiator Decomposition Rate Constants

| Temperature (° C.) | $k_D$ (×10⁴ s) | F |
|---|---|---|
| 65 | 2.4 | 0.61 |
| 70 | 4.3 | 0.69 |
| 75 | 10.3 | 0.59 |
| 85 | 35.1 | 0.63 |

Figure 3:
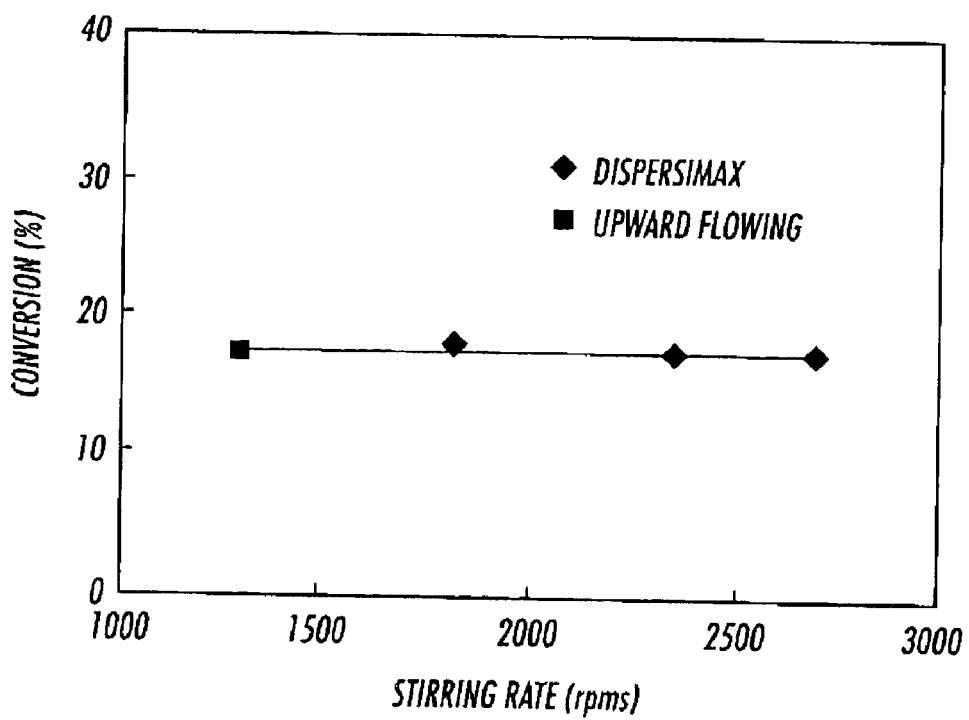
FIG. 3. Effect of agitation on the monomer conversion (X). The points are experimental data and the line is a linear least-squares regression fit to the points. The polymerization conditions were P=276 bar, T=75° C., $v_{CO2}$=26 g/min, $[VF2]_{INLET}$=0.77 M, $[EPDC]_{INLET}$=3 mM, and τ=21 minutes. ♦=Dispersimax™ Impeller, ■=Upward pumping impeller.

Effect of Agitation on VF2 Polymerization. Our first polymerization experiments dealt with the effect of agitation on the polymerization. FIG. 3 provides the effect of stirring rate and agitator type on monomer conversion (X). The 1.25" diameter dispersimax™ agitator, which is a 6-bladed Rushton-type turbine (d/D=0.42), was studied from 1300–2700 rpm. This type of agitator provides mainly radial flow (Geankoplis, C. J., *Transport Processes and Unit Operations*. Third ed. 1993, Englewood Cliffs, N.J.: Prentice Hall). It is clear that the conversion is not affected by the stirring rate for the region investigated. For the lowest stirring rate investigated, 1300 rpm, an in-house designed pitched-blade turbine agitator also was investigated. This agitator is a 4-bladed, 45° pitch, upward pumping agitator designed to provide a combination of axial and radial flow in order to suspend precipitated particles. This agitator was studied at the lowest rpm to minimize bearing wear in case of any offset in manufacture. The conversion obtained with this agitator is identical to that obtained with the Dispersimax™ impeller, indicating that no effect of agitator geometry was obtained on conversion, for the conditions studied. In addition to the conversions being identical for the mixing study, PVDF molecular weights (MWs) determined by gel permeation chromatography (GPC), were found to be identical for polymer samples taken at both the lowest RPM studied for both agitators, and the highest RPM studied for the Dispersimax™ impeller. The results from the X and MW data lead us to believe that the kinetics were not effected by mixing in this study. For all subsequent experiments reported, the Dispersimax™ impeller was used at a stirring rate of 1800 rpm.

Determination of the Rate of Polymerization ($R_p$) Model Equation. (i) Determination of Monomer Order. In order to derive a model equation for the rate of polymerization ($R_p$), we must first determine the order of the reaction with respect to both monomer and initiator. The mass balance for monomer around the reactor, modeled as an ideal CSTR, can be simplified to provide the rate of polymerization ($R_p$):

$$R_p = \frac{([M]_{IN} - [M]_{OUT})}{\tau} \quad (2)$$

Figure 4:
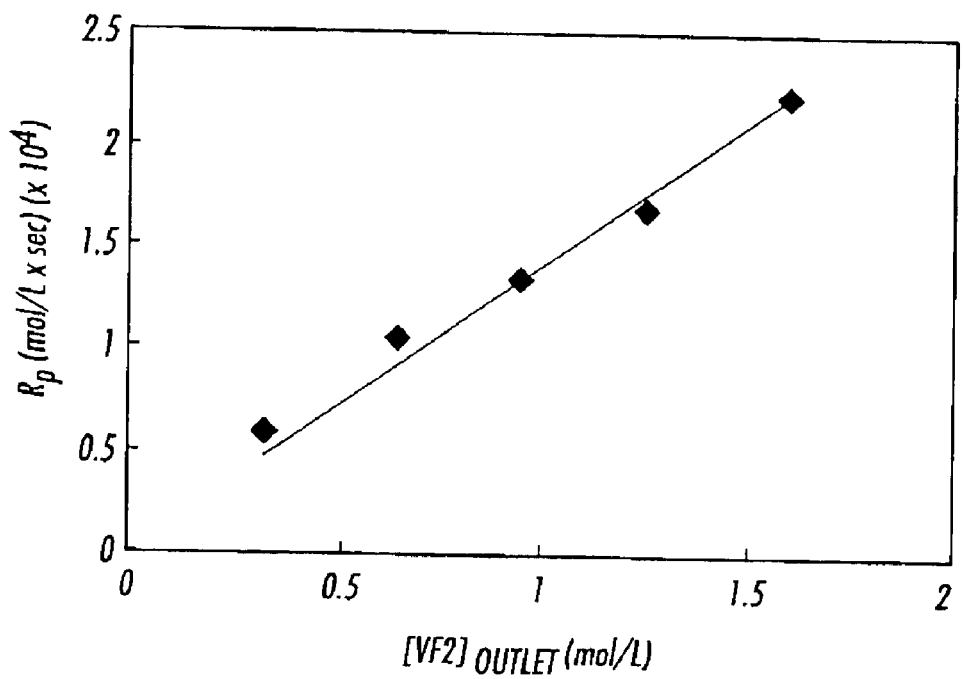
FIG. 4. Plot of $R_p$ versus $[VF2]_{OUT}^{1.0}$ to show first order dependence of polymerization rate on monomer concentration. The points are experimental data and the line is a linear least-squares regression fit to the points. The polymerization conditions were P=276 bar, T=75° C., $v_{CO2}$=26 g/min, $[EPDC]_{INLET}$=3 mM, and τ=21 minutes.

For an ideal CSTR, the reactor concentrations are the same as the outlet concentrations (Levenspiel, O., *Chemical Reaction Engineering*. Second ed. 1972, New York: John Wiley & Sons). For the work reported on here, the outlet monomer concentration was determined by mass-balance (gravimetrically by weighing the polymer collected at steady-state) and confirmed by on-line GC analysis. This allows us to determine $R_p$ experimentally, as both the inlet monomer concentration and the mean residence time of the reactor τ are known. FIG. 4 provides the plot of $R_p$ versus $[VF2]^{1.0}$ which illustrates that this polymerization is first-order with respect to monomer. First-order dependency is generally obtained in free-radical kinetics for monomer consumption (Odian, G., *Principles of Polymerization*. 3rd ed. 1991, New York: John Wiley & Sons, Inc).

For subsequent experiments, monomer inlet concentrations of 0.82 M were used. Equation 2 is used for the experimentally determined $R_p$'s reported on here.

ii) Determination of Initiator Order. The initiator concentration in the reactor, which is identical to the outlet concentration for an ideal CSTR, is given by:

$$[I]_{OUT} = \frac{[I]_{IN}}{1 + k_D \tau} \quad (7)$$

Figure 5:
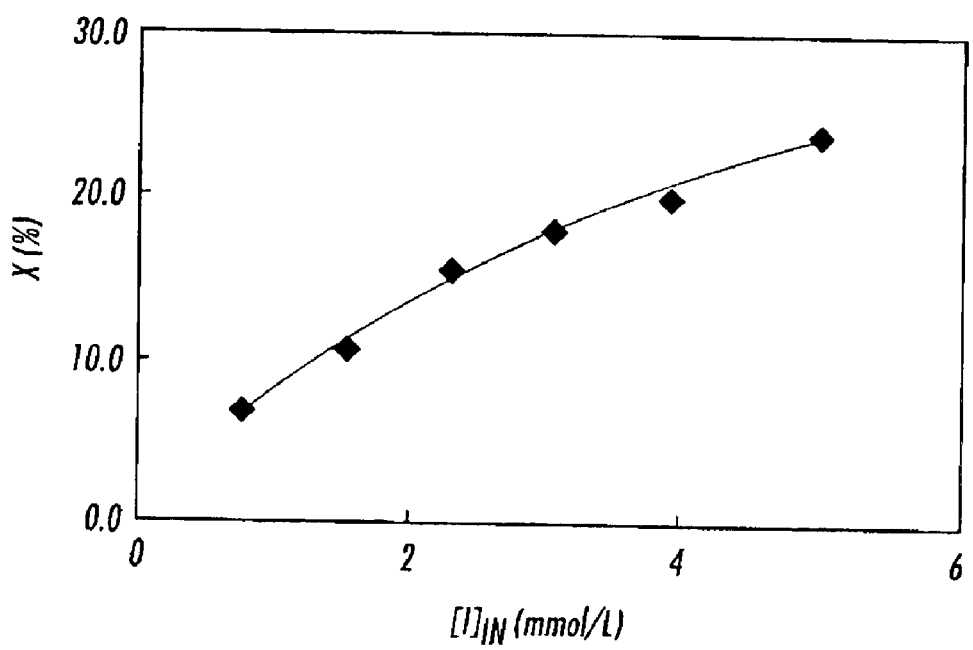
FIG. 5. Effect of inlet initiator concentration, $[I]_{IN}$, on the monomer conversion (X). The points are experimental data. The polymerization conditions were P=276 bar, T=75° C., $v_{CO2}$=26 g/min, $[VF2]_{INLET}$=0.77 M, and τ=21 minutes.

Hence, the concentration of initiator in the reactor is given by the outlet concentration, $[I]_{OUT}$, which can be determined from the inlet concentration, $[I]_{IN}$, the mean residence time, $\tau$, and the decomposition rate constant, $k_D$ (provided in Table 3). FIG. 5 provides the plot of monomer conversion (X) versus the inlet initiator concentration, i.e. $[I]_{IN}$. It is evident that the conversion increases with an increase in initiator concentration, as more free radicals are generated to initiate polymer chains.

Figure 6:
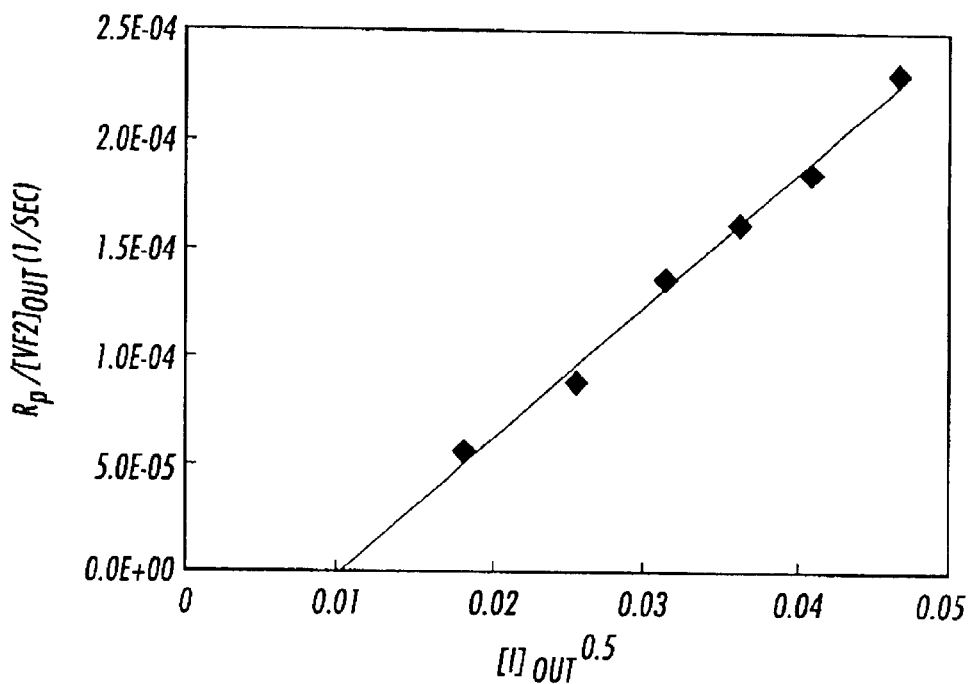
FIG. 6. Plot of $R_p/[VF2]_{OUT}$ versus $[I]_{OUT}^{0.5}$ to show square root dependence of polymerization rate on initiator concentration. The points are experimental data and the line is a linear least-squares regression fit to the points. The polymerization conditions were the same as FIG. 5.

FIG. 6 provides the plot of $R_p$ versus $[I]_{OUT}^{0.5}$, which shows that the order of the reaction with respect to initiator is 0.5. However, note that a small offset error occurred, $[I-I^*]^{0.5}$. For future calculations, $[I-I^*]^{0.5}$, is used to account for this error. For subsequent experiments, initiator inlet concentrations of 3 mM were used.

Half-order dependency is normally obtained in free-radical kinetics for initiator consumption, although conventional heterogeneous polymerizations, such as vinyl chloride or acyrlonitrile polymerizations, often show initiator exponents exceeding this classical value (Eastmond, G. C., *Radical Polymerization*, in *Encyclopedia of Polymer Science and Engineering*, H. Mark, Editor. p. 708–855). This behavior is often attributed to the polymer radicals precipitating during the reaction in the nonsolvent environment, forming tightly coiled chains which "trap" or "occlude" the radicals. These trapped radicals can react with monomer but have trouble terminating, hence leading to autoacceleration and initiator exponents greater than 0.5. Normally radical trapping decreases with increasing polymerization temperatures. As we used a relatively high temperature in this study, i.e. 75° C., and $CO_2$ densities that cause the polymer chains to be plasticized, hence increasing the free-volume of the polymer and mobility of the chain-ends, radical trapping is minimized.

iii) Determination of the $k_p/k_t^{0.5}$ Ratio. To continue our goal for determining an appropriate model equation for the $R_p$ of VF2 in our experimental system in $scCO_2$, and assuming simple chain-growth kinetics in a CSTR, we can develop our model using the following main assumptions, (1) Polymerization in fluid phase only. (2) QSSA, LCA: Quasi-steady-state assumption (QSSA) is considered for the radical species. Moreover, because the large molecular weights usually obtained, the long-chain assumption (LCA) is introduced, thus neglecting any dependence of reactivity upon length. i.e.:

$$R_p = k_p [M \cdot][M]_{OUT} \quad (8)$$

And $$R_t = 2k_t[M \cdot]^2 = R_i \quad (9)$$

Combining (8) and (9) gives $$R_p = k_p[M]_{OUT}(R_i/2k_t)^2 \quad (10)$$

and as:

$$R_i = 2fk_d[I]_{OUT} \quad (11)$$

we can derive an expression for the theoretical $R_p$ for our experimental reactor:

$$R_p = (k_p/k_t^{0.5})(fk_d([I]_{OUT}-I^*))^{0.5}[M]_{OUT}^{1.0} \quad (12)$$

Equation 12 is hereafter referred to as the model equation for determining the $R_p$. In order to utilize our model equation 12, we must first determine experimental values for the $k_p/k_t^{0.5}$ ratio, which should only depend on the reactor temperature for a given $CO_2$ density (the polarity of the solvent as effected by monomer concentration may also have an effect on this ratio). In order to study the effect of the reaction temperature on our polymerizations, hence allowing us to determine the $k_p/k_t^{0.5}$ ratio as a function of temperature, the reactor pressure was varied to provide a constant $CO_2$ density of 0.74 g/ml. Combining equations (12) and (2) provides an expression that allows $k_p/k_t^{0.5}$ to be determined experimentally.

$$k_p/k_t^{0.5} = \{[M]_{IN}-[M]_{OUT}\}/((\tau\{fk_d([I]_{OUT}-I^*)\}^{0.5}[M]_{OUT}^{1.0}) \quad (13)$$

This allows us to utilize the Arrhenius relationship for the $k_p/k_t^{0.5}$ ratio.

$$\ln[k_p/k_t^{0.5}] = \ln[A_p/A_t^{0.5}] - \frac{E_p - (E_t/2)}{RT} \quad (14)$$

Figure 7:
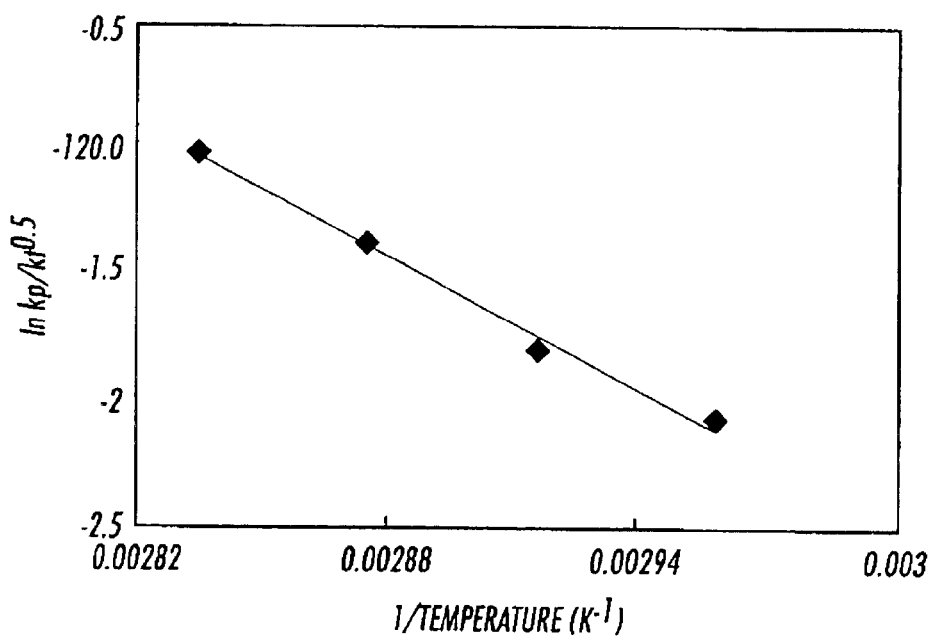
FIG. 7. Plot of In $k_p/k_t^{0.5}$ versus 1/T to show fit with respect to kinetic analysis. The line is a linear least-squares regression fit to the points. The polymerization conditions were $\rho_{CO2}$=0.74 g/ml, $v_{CO2}$=26 g/min, $[VF2]_{INLET}$=0.77 M, $[DEPDC]_{INLET}$=3.0 mM, and τ=21 minutes.

FIG. 7 provides the plot of equation 14, which is linear indicating that this system follows the Arrhenius relationship in the region investigated. An $E_p-(E_t/2)$ value of 69 kj/mol was determined from this plot. Table 4 provides the $k_p/k_t^{0.5}$ values determined for the 4 temperatures studied.

Figure 8:
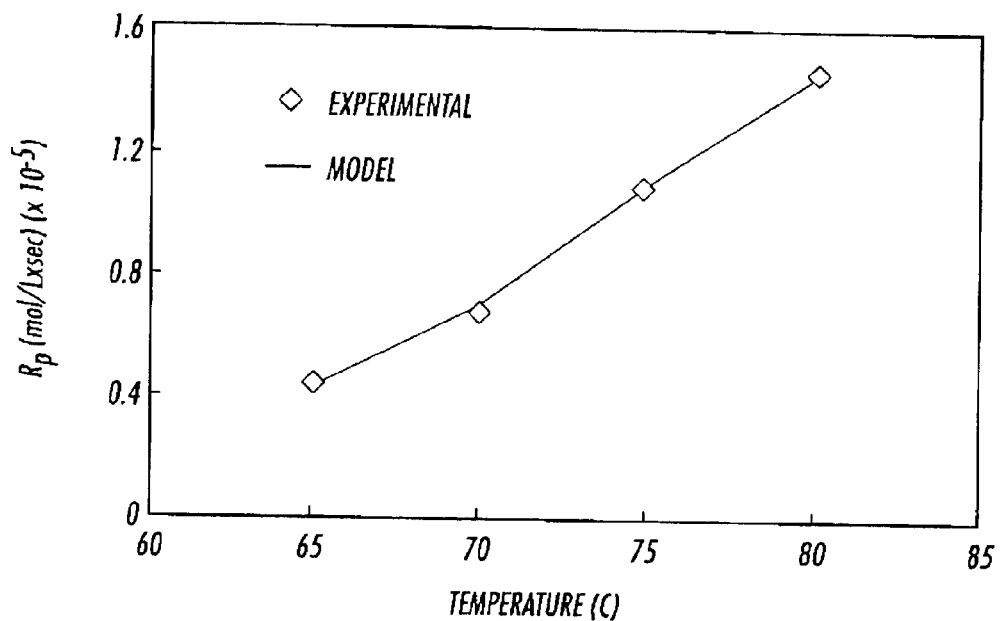
FIG. 8. Effect of polymerization temperature on the rate of polymerization ($R_p$). The points are experimental data. The line is model equation 12 for the $R_p$. The experimental conditions are provided in FIG. 7.

FIG. 8 shows the effect of reactor temperature on the experimentally determined $R_p$ (determined from equation 2) and compares these values to those predicted from model equation 12. The agreement with the model equation is excellent. As expected, $R_p$ increases rapidly with temperature.

TABLE 4

$k_p/k_t^{0.5}$ Values determined from Experimental Data

| Temperature (° C.) | $K_p/k_t^{0.5}$ |
|---|---|
| 65 | 0.12 |
| 70 | 0.18 |
| 75 | 0.25 |
| 80 | 0.36 |

Figure 9:
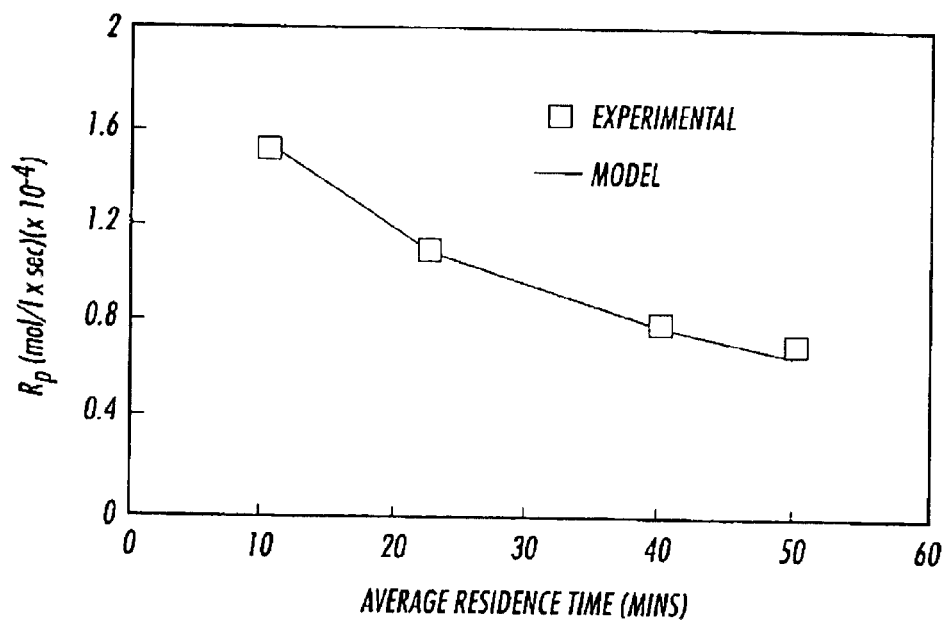
FIG. 9. Effect of mean reactor residence time, τ, on the rate of polymerization ($R_p$). The points are experimental data. The line is model equation 12 for the $R_p$. The polymerization conditions were P=276 bar, T=75° C., $v_{CO2}$=26 g/min, $[VF2]_{INLET}$=0.77 M and $[DEPDC]_{INLET}$=3.0 mM.

Effect of Reactor Mean Residence Time ($\tau$) on $R_p$. In order to test our developed model under varying experimental conditions, the effect of the mean residence time, $\tau$, as controlled by the flow of reactants was investigated in the region of 10–50 minutes. The flow-rates of $CO_2$, monomer and initiator were adjusted for each of the $\tau$ values studied to give identical inlet concentrations of monomer and initiator. FIG. 9 provides the $R_p$ values determined experimentally from equation 2, and compares them to those calculated from our model equation 12. The $R_p$ values decrease with increasing $\tau$, as expected, as low $\tau$ values have the highest $[VF2]_{OUT}$ and $[I]_{OUT}$ values. Once again, the experimental data follows the model equation very closely.

Figure 10:
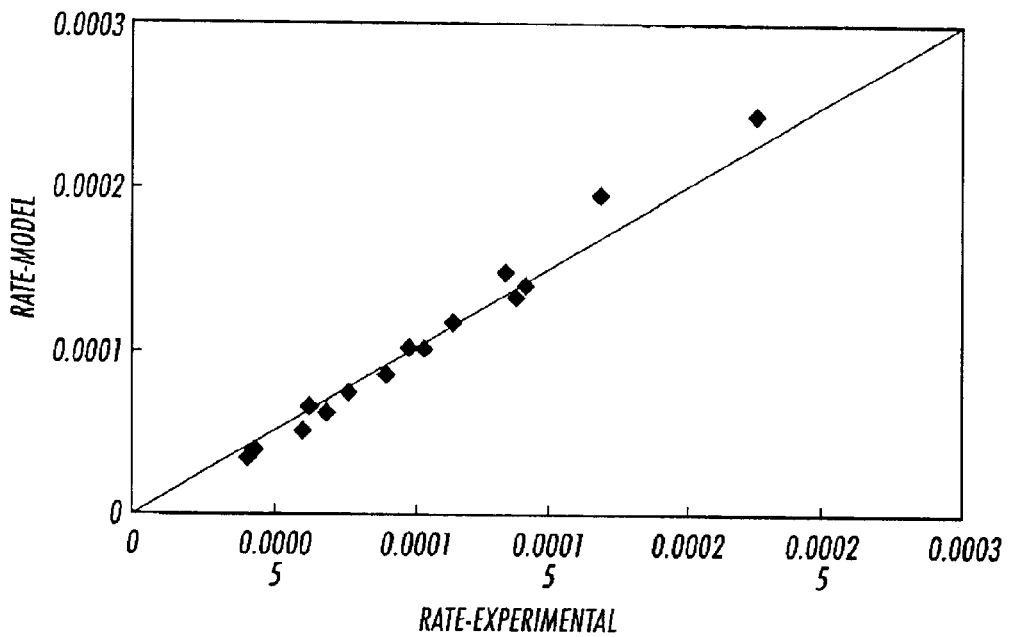
FIG. 10. Parity plot showing the fit of all experimental data to that predicted from model equation 12.

FIG. 10 provides the parity plot of all experimental data reported on in this study, which compares the experimental $R_p$ data determined from equation 2, to that predicted from model equation 12. This plot provides strong evidence that the Rp's can be described quite well by our simple model equation 12. This behavior indicates that we can describe our precipitation polymerization as a pseudobulk system.

Determination of Model Equations Describing the MWDs of PVDF. Our model equation for $M_n$ is obtained from the kinetic chain length, $v$, by assuming that: a) the heterogeneous polymerization occurs in a single phase, b) there is no chain transfer, c) all termination occurs by combination, and d) the accumulated polymer distribution is the same as the instantaneous distribution (which is true for an ideal CSTR). In other words, the instantaneous MWD defines a most probable distribution with polydispersity index of 1.5 where all termination occurs by combination (Flory, P. J., *Principles of Polymer Chemistry*. 1953, Ithaca, New York: Cornell University Press. 161).

$$M_n = \frac{M_o k_p [M]_{OUT}}{(f \cdot k_d k_t)^{1/2} (I - I^*)^{1/2}} \quad (15)$$

$$M_W = 1.5 \cdot M_n \quad (16)$$

Figure 11:
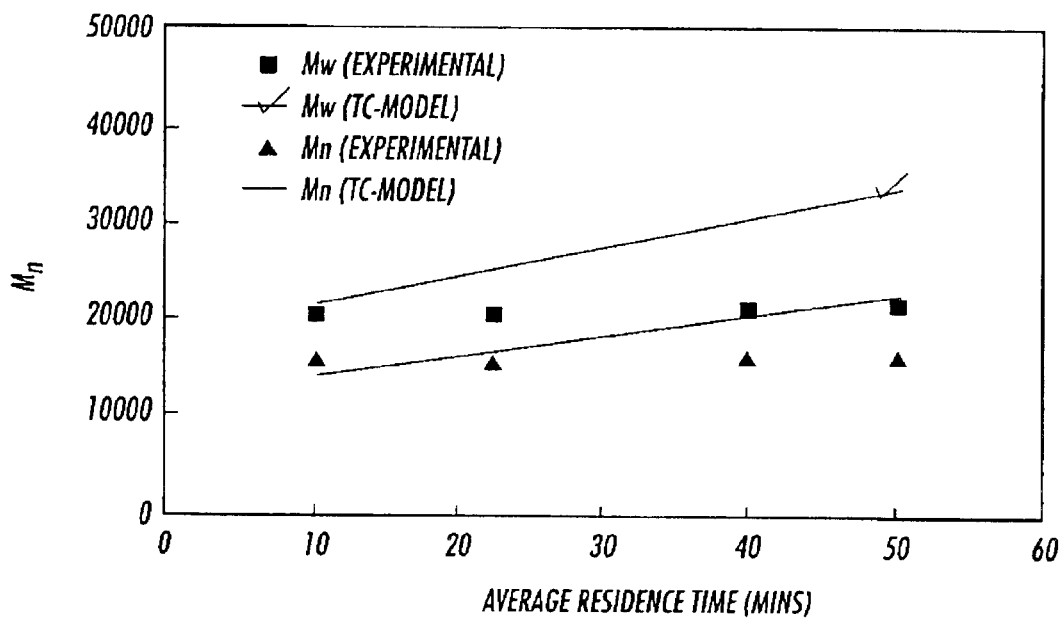
FIG. 11. Effect of outlet monomer concentration, $[VF2]_{OUT}$, on the number and weight average molecular weights, $M_N$ and $M_W$ determined experimentally by GPC. The points are experimental data. The polymerization conditions are the same as FIG. 8.

FIG. 11 shows how the number and weight average molecular weights ($M_n$ and $M_w$) increase with increasing outlet monomer concentration and provides a comparison to model equations. We see that our experimental data fits the simple model equations reasonably well at low monomer concentrations for $M_n$ and fits very well for $M_w$ across all monomer concentrations studied.

Conclusions. For the precipitation polymerization of VF2 in $scCO_2$, simple chain-growth kinetics were approximated for this heterogeneous polymerization and the order of the reaction with respect to initiator was found to be 0.5 and with respect to monomer 1.0. Stirring rate and agitator design were found to have no effect on the rate of polymerization. The conversion of VF2 in these polymerizations ranged from 7 to 26%, and the rate of polymerization ($R_p$) reached a maximum of $34 \times 10^{-5}$ mol/L·s at a VF2 feed monomer concentration of 3.5 mol/L at 75° C. The poly(vinylidene fluoride) (PVDF) polymer was collected as a dry "free-flowing" powder, and has been characterized by gel permeation chromatography (GPC) giving $M_w$'s up to 104 kg/mol and PDIs as low as 1.3. Termination of polymer chains appears to occur by combination.

EXAMPLE 3

Large-Scale Apparatus

Figure 12:
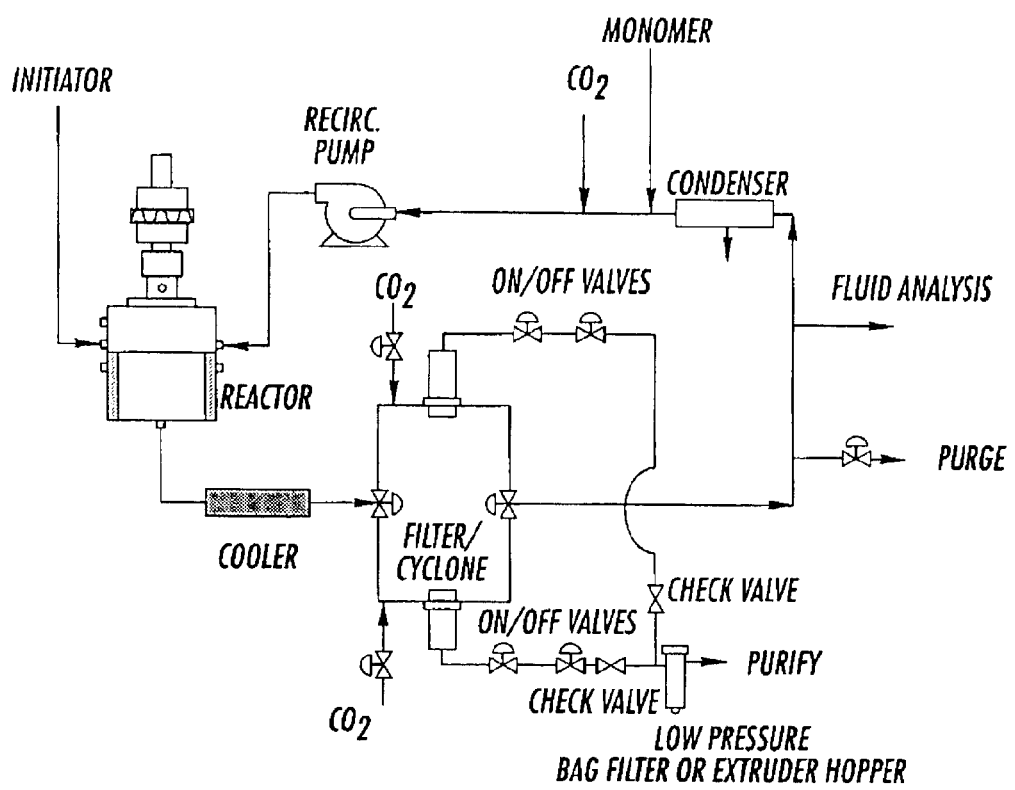
FIG. 12 is a schematic diagram of a large-scale continuous polymerization apparatus employing cyclone separators, with recycle of the reaction medium.

One embodiment of a scaled-up apparatus for implementing the present invention is described in FIG. 12. Initiator is transported continuously to a reactor, along with, and at a separate location from, carbon dioxide and monomer, which are introduced via a recirculation line through a recirculation pump. Make-up $CO_2$ and monomer may be introduced through the top of the reactor if so desired as depicted. Upon exiting the reactor, the effluent stream is cooled and is transported to a separator (e.g., a filter or cylcone configuration). Polymer product exits through the bottom of the reactor and is collected in the separator. Carbon dioxide, either through the top or bottom of the reactor, may be employed to assist with transporting the polymer to a low pressure bag filter or extruder hopper.

An effluent stream comprising carbon dioxide, unreacted monomer (if any), and unreacted initiator (if any) is recycled back to the reactor as shown in FIG. 12. A purge is bled off from as a portion of the effluent stream. A liquid stream may optionally be collected through the bottom of the condenser if so desired.

EXAMPLE 4

Residence Time Distribution of an Experimental Reactor

Figure 16:
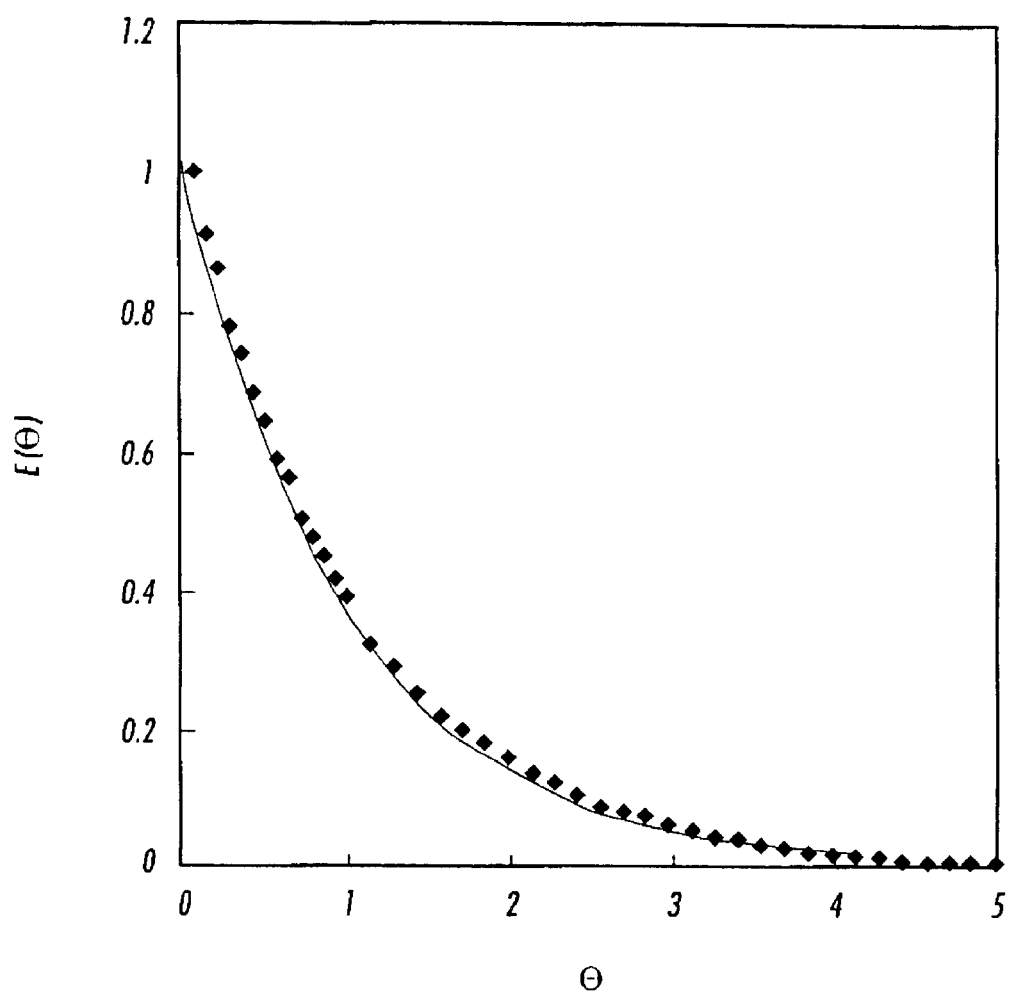
FIG. 16 is a graph comparing the dimensionless exit age distribution function E(Θ) versus Θ for an ideal CSTR and an experimental reactor.

The residence time distribution of an experimental reactor of the present invention was evaluated using a pulse injection of tracer. For temperatures between 50° C. and 90° C. and pressures between 207 bar and 320 bar, and mean residence times as low as 13 minutes, the experimental reactor behaved as an ideal CSTR. The results are presented in FIG. 16.

In the drawings and specification, there have been disclosed typical preferred embodiments of the invention and, although specific terms are employed, they are used in generic and descriptive sense only and not for the purposes of limitation, the scope of the invention being set forth in the following claims.

That which is claimed is:

1. A method for carrying out the continuous polymerization of a monomer in a carbon dioxide reaction medium, said method comprising the steps of:
   (a) providing an apparatus including a continuous reaction vessel and a separator, wherein said reaction vessel is configured to provide a dimensionless exit age distribution function ($E(\Theta)$) which reaches a maximum value between about $\Theta=0$ and about $\Theta=0.3$ and thereafter declines monotonically after reaching its maximum value;
   (b) carrying out a polymerization reaction in said reaction vessel by combining a monomer, an initiator, and a carbon dioxide reaction medium therein, wherein said reaction medium comprises liquid or supercritical carbon dioxide, and wherein said reaction produces a solid polymer product in said reaction vessel; then
   (c) withdrawing a continuous effluent stream from said reaction vessel during said polymerization reaction, wherein said continuous effluent stream is maintained as a liquid or supercritical fluid; then
   (d) passing said continuous effluent stream through said separator and separating said solid polymer therefrom while maintaining said effluent stream as a liquid or supercritical fluid; and then
   (e) returning at least a portion of said continuous effluent stream to said reaction vessel while maintaining said effluent stream as a liquid or supercritical fluid at a pressure not more than about 100 psi less than the pressure in said reaction vessel, whereby the need for significant recompression of said continuous effluent stream prior to return to said reaction vessel is minimized.

2. A method according to claim 1, wherein said polymerization reaction is selected from the group consisting of precipitation, microemulsion, emulsion, suspension, and dispersion polymerization reactions.

3. A method according to claim 1, wherein said initiator is soluble in said liquid or supercritical reaction medium.

4. A method according to claim 3, wherein said initiator is toxic.

5. A method according to claim 1, wherein said reaction vessel is a stirred tank reactor.

6. A method according to claim 1, wherein said reaction vessel is an ideal stirred tank reactor.

7. A method according to claim 1, wherein said reaction vessel is a continuous loop reactor.

8. A method according to claim 1, wherein the monomer is a vinyl monomer.

9. A method according to claim 8, wherein the vinyl monomer is selected from the group consisting of an aromatic vinyl monomer, a conjugated diene monomer, an unsaturated acid monomer, a nitrogen-containing monomer, a non-aromatic unsaturated monocarboxylic ester monomer, and mixtures thereof.

10. A method according to claim 1, wherein the monomer is a fluorinated monomer.

11. A method according to claim 10, wherein the fluorinated monomer is selected from the group consisting of a fluoroacrylate monomer, a fluorostyrene monomer, a fluoroalkylene oxide monomer, a fluoroolefin monomer, and mixtures thereof.

12. A method according to claim 1, wherein the monomer is vinylidene fluoride.

13. A method according to claim 1, wherein the monomer is acrylic acid.

14. A method according to claim 1, wherein the polymer is a copolymer.

15. A method according to claim 1, wherein the initiator is a free radical initiator.

16. A method according to claim 15, wherein the initiator is selected from the group consisting of acetylcyclohexanesulfonyl peroxide; diacetyl peroxydicarbonate; diethyl peroxydicarbonate; dicyclohexyl peroxydicarbonate; di-2-ethylhexyl peroxydicarbonate; tert-butyl perneodecanoate; 2,2'-azobis(methoxy-2,4-dimethylvaleronitrile); tert-butyl perpivalate; dioctanoyl peroxide; dilauroyl peroxide; 2,2'-azobis(2,4-dimethylvaleronitrile); tert-butylazo-2-cyanobutane; dibenzoyl peroxide; tert-butyl per-2-ethylhexanoate; tert-butyl permaleate; 2,2-azobis (isobutyronitrile); bis(tert-butylperoxy) cyclohexane; tert-butyl peroxyisopropylcarbonate; tert-butyl peracetate; 2,2-bis(tert-butylperoxy) butane; dicumyl peroxide; di-tert-amyl peroxide; di-tert-butyl peroxide; p-methane hydroperoxide; pinane hydroperoxide; cumene hydroperoxide; tert-butyl hydroperoxide; and mixtures thereof.

17. A method for carrying out the continuous polymerization of a monomer in a carbon dioxide reaction medium, said method comprising the steps of:

(a) providing an apparatus including a continuous reaction vessel, a first separator, and a second separator;

(b) carrying out a polymerization reaction in said reaction vessel by combining a monomer, an initiator, and a carbon dioxide reaction medium therein, wherein said reaction medium comprises liquid or supercritical carbon dioxide, and wherein said reaction produces a solid polymer product in said reaction vessel; then (c) withdrawing a continuous effluent stream from said reaction vessel during said polymerization reaction, passing said effluent stream through said first separator while maintaining said effluent stream as a liquid or supercritical fluid and separating said solid polymer therefrom; and then returning said effluent stream to said reaction vessel; and then (d) withdrawing a continuous effluent stream from said reaction vessel during said polymerization reaction, passing said effluent stream through said second separator while maintaining said effluent stream as a liquid or supercritical fluid and separating said solid polymer therefrom, and then returning at least a portion of said effluent stream to said reaction vessel, while concurrently removing said solid polymer separated in said first separator during said withdrawing step (c).

18. A method according to claim 17, wherein step (d) is followed by the step of: (e) repeating said withdrawing step (c) while concurrently removing said solid polymer separated in said second separator during said withdrawing step (d).

19. A method according to claim 17, wherein said polymerization reaction is selected from the group consisting of precipitation, microemulsion, emulsion, suspension, and dispersion polymerization reactions.

20. A method according to claim 17, wherein said initiator is soluble in said liquid or supercritical reaction medium.

21. A method according to claim 17, wherein said initiator is returned to said reaction vessel in said reaction medium after said step of passing said effluent stream through said separator.

22. A method according to claim 17, wherein said initiator is toxic.

23. A method according to claim 17, wherein said reaction vessel is a stirred tank reactor.

24. A method according to claim 17, wherein said reaction vessel is an ideal stirred tank reactor.

25. A method according to claim 17, wherein said reaction vessel is a continuous loop reactor.

26. A method according to claim 17, wherein said reaction vessel is configured to provide a dimensionless exit age distribution function ($E(\Theta)$) which reaches a maximum value between about $\Theta=0$ and about $\Theta=0.3$ and thereafter declines monotonically after reaching its maximum value.

27. A method according to claim 17, wherein said reaction vessel is configured to provide a cumulative exit age distribution (F) of from about 0.45 to about 0.70 when $\Theta=1$.

28. A method according to claim 17, wherein the monomer is a vinyl monomer.

29. A method according to claim 28, wherein the vinyl monomer is selected from the group consisting of an aromatic vinyl monomer, a conjugated diene monomer, an unsaturated acid monomer, a nitrogen-containing monomer, a non-aromatic unsaturated monocarboxylic ester monomer, and mixtures thereof.

30. A method according to claim 17, wherein the monomer is a fluorinated monomer.

31. A method according to claim 30, wherein the fluorinated monomer is selected from the group consisting of a fluoroacrylate monomer, a fluorostyrene monomer, a fluoroalkylene oxide monomer, a fluoroolefin monomer, and mixtures thereof.

32. A method according to claim 17, wherein the monomer is vinylidene fluoride.

33. A method according to claim 17, wherein the monomer is acrylic acid.

34. A method according to claim 17, wherein the polymer is a copolymer.

35. A method according to claim 17, wherein the initiator is a free radical initiator.

36. A method according to claim 35, wherein the initiator is selected from the group consisting of acetylcyclohexanesulfonyl peroxide; diacetyl peroxydicarbonate; diethyl peroxydicarbonate; dicyclohexyl peroxydicarbonate; di-2-ethylhexyl peroxydicarbonate; tert-butyl perneodecanoate; 2,2'-azobis(methoxy-2,4-dimethylvaleronitrile); tert-butyl perpivalate; dioctanoyl peroxide; dilauroyl peroxide; 2,2'-azobis(2,4-dimethylvaleronitrile); tert-butylazo-2-cyanobutane; dibenzoyl peroxide; tert-butyl per-2-ethylhexanoate; tert-butyl permaleate; 2,2 -azobis (isobutyronitrile); bis(tert-butylperoxy) cyclohexane; tert-butyl peroxyisopropylcarbonate; tert-butyl peracetate; 2,2-bis(tert-butylperoxy) butane; dicumyl peroxide; di-tert-amyl peroxide; di-tert-butyl peroxide; p-methane hydroperoxide; pinane hydroperoxide; cumene hydroperoxide; tert-butyl hydroperoxide; and mixtures thereof.

37. A method for carrying out the continuous polymerization of a monomer in a carbon dioxide reaction medium, said method comprising the steps of:

(a) providing an apparatus including a continuous reaction vessel and a separator wherein said reaction vessel is configured to provide a cumulative exit age distribution (F) of from about 0.45 to about 0.70 when $\Theta=1$;

(b) carrying out a polymerization reaction in said reaction vessel by combining a monomer, an initiator, and a carbon dioxide reaction medium therein, wherein said reaction medium comprises liquid or supercritical carbon dioxide, and wherein said reaction produces a solid polymer product in said reaction vessel; then (c) withdrawing a continuous effluent stream from said reaction vessel during said polymerization reaction, wherein said continuous effluent stream is maintained as a liquid or supercritical fluid; then (d) passing said continuous effluent stream through said separator and separating said solid polymer therefrom while maintaining said effluent stream as a liquid or supercritical fluid; and then (e) returning at least a portion of said continuous effluent stream to said reaction vessel while maintaining said effluent stream as a liquid or supercritical fluid at a pressure not more than about 100 psi less than the pressure in said reaction vessel, whereby the need for significant recompression of said continuous effluent stream prior to return to said reaction vessel is minimized.

38. A method according to claim 37, wherein said polymerization reaction is selected from the group consisting of precipitation, microemulsion, emulsion, suspension, and dispersion polymerization reactions.

39. A method according to claim 37, wherein said initiator is soluble in said liquid or supercritical reaction medium.

40. A method according to claim 39, wherein said initiator is toxic.

41. A method according to claim 37, wherein said reaction vessel is a stirred tank reactor.

42. A method according to claim 37, wherein the monomer is a vinyl monomer.

43. A method according to claim 42, wherein the vinyl monomer is selected from the group consisting of an aromatic vinyl monomer, a conjugated diene monomer, an unsaturated acid monomer, a nitrogen-containing monomer, a non-aromatic unsaturated monocarboxylic ester monomer, and mixtures thereof.

44. A method according to claim 37, wherein the monomer is a fluorinated monomer.

45. A method according to claim 44, wherein the fluorinated monomer is selected from the group consisting of a fluoroacrylate monomer, a fluorostyrene monomer, a fluoroalkylene oxide monomer, a fluoroolefin monomer, and mixtures thereof.

46. A method according to claim 37, wherein the monomer is vinylidene fluoride.

47. A method according to claim 37, wherein the monomer is acrylic acid.

48. A method according to claim 37, wherein the polymer is a copolymer.

49. A method according to claim 37, wherein the initiator is a free radical initiator.

50. A method according to claim 49, wherein the initiator is selected from the group consisting of acetylcyclohexanesulfonyl peroxide; diacetyl peroxydicarbonate; diethyl peroxydicarbonate; dicyclohexyl peroxydicarbonate; di-2-ethylhexyl peroxydicarbonate; tert-butyl perneodecanoate; 2,2'-azobis(methoxy-2,4-dimethylvaleronitrile); tert-butyl perpivalate; dioctanoyl peroxide; dilauroyl peroxide; 2,2'-azobis(2,4-dimethylvaleronitrile); tert-butylazo-2-cyanobutane; dibenzoyl peroxide; tert-butyl per-2-ethylhexanoate; tert-butyl permaleate; 2,2-azobis(isobutyronitrile); bis(tert-butylperoxy) cyclohexane; tert-butyl peroxyisopropylcarbonate; tert-butyl peracetate; 2,2-bis(tert-butylperoxy) butane; dicumyl peroxide; di-tert-amyl peroxide; di-tert-butyl peroxide; p-methane hydroperoxide; pinane hydroperoxide; cumene hydroperoxide; tert-butyl hydroperoxide; and mixtures thereof.

51. A method for carrying out the continuous polymerization of a monomer in a carbon dioxide reaction medium, said method comprising the steps of:

(a) providing an apparatus including a continuous reaction vessel and a separator, wherein said reaction vessel is a continuous loop reactor;

(b) carrying out a polymerization reaction in said reaction vessel by combining a monomer, an initiator, and a carbon dioxide reaction medium therein, wherein said reaction medium comprises liquid or supercritical carbon dioxide, and wherein said reaction produces a solid polymer product in said reaction vessel; then c) withdrawing a continuous effluent stream from said reaction vessel during said polymerization reaction, wherein said continuous effluent stream is maintained as a liquid or supercritical fluid; then d) passing said continuous effluent stream through said separator and separating said maintaining said effluent stream as a liquid or supercritical fluid; and then e) returning at least a portion of said continuous effluent stream to said reaction vessel while maintaining said effluent stream as a liquid or supercritical fluid at a pressure not more than about 100 psi less than the pressure in said reaction vessel, whereby the need for significant recompression of said continuous effluent stream prior to return to said reaction vessel is minimized.

* * * * *

UNITED STATES PATENT AND TRADEMARK OFFICE
CERTIFICATE OF CORRECTION

| | | |
|---|---|---|
| PATENT NO. | : 6,914,105 B1 | Page 1 of 1 |
| APPLICATION NO. | : 09/709206 | |
| DATED | : July 5, 2005 | |
| INVENTOR(S) | : Charpentier et al. | |

It is certified that error appears in the above-identified patent and that said Letters Patent is hereby corrected as shown below:

Column 24,
Line 36 should read --separator and separating said polymer therefrom while maintaining said effluent --

Signed and Sealed this

Fifth Day of June, 2007

JON W. DUDAS
*Director of the United States Patent and Trademark Office*